United States Patent
Jiang et al.

(10) Patent No.: US 8,913,848 B2
(45) Date of Patent: Dec. 16, 2014

(54) MICROSCOPIC IMAGE FUSION METHOD BASED ON REGION GROWING

(71) Applicant: Ningbo University, Ningbo, Zhejiang (CN)

(72) Inventors: Gangyi Jiang, Zhejiang (CN); Cuixia Bai, Zhejiang (CN); Mei Yu, Zhejiang (CN); Yigang Wang, Zhejiang (CN); Zongju Peng, Zhejiang (CN); Feng Shao, Zhejiang (CN)

(73) Assignee: Ningbo University, Ningbo, Zhejiang Province (CN)

( * ) Notice: Subject to any disclaimer, the term of this patent is extended or adjusted under 35 U.S.C. 154(b) by 104 days.

(21) Appl. No.: 13/775,195

(22) Filed: Feb. 24, 2013

(65) Prior Publication Data

US 2013/0223760 A1  Aug. 29, 2013

(30) Foreign Application Priority Data

Feb. 29, 2012 (CN) .......................... 2012 1 0050205

(51) Int. Cl.
*G06T 3/40* (2006.01)
*G06T 5/50* (2006.01)

(52) U.S. Cl.
CPC .... *G06T 3/40* (2013.01); *G06T 5/50* (2013.01)
USPC ............ 382/284; 362/132; 362/133; 362/275

(58) Field of Classification Search
CPC ... G06T 3/40; G06T 5/50; G06T 2207/20141; G06T 2207/20221
USPC ........... 382/284, 275, 132, 133; 378/41, 387, 378/162
See application file for complete search history.

(56) References Cited

U.S. PATENT DOCUMENTS

| | | | |
|---|---|---|---|
| 2006/0050984 A1* | 3/2006 | Tilton | 382/275 |
| 2012/0106821 A1* | 5/2012 | Madabhushi et al. | 382/133 |
| 2013/0034203 A1* | 2/2013 | Wang et al. | 378/41 |

OTHER PUBLICATIONS

Bai Cuixia Jiang Gangyi Yu Mei Wang Yigang Shao Feng Peng Zon, "Journal of Electronics" (China), vol. 30 No. 1, Feb. 2013,vol. 3 No. 1 p. 91-96.*
A. P. James, B. V. Dasarathy, "Medical Image Fusion: A survey of the state of the art",survey of the state of the art, Information Fusion, 2014, pp. 45.*

* cited by examiner

*Primary Examiner* — Mekonen Bekele

(57) ABSTRACT

A microscopic image fusion method based on region growing judges the fuzzy degree of the microscopic image and determines the fuzzy seed block by evaluating the definition of every image block in the microscopic image. Then, the fuzzy region and clear region are exactly segmented by region growing and are marked. Finally, a clear and high-quality microscopic image, fused by a plurality of microscopic images, is obtained. Due to the combination of the definition evaluation of the microscopic image, and segmentation of the fuzzy region and clear region by region growing, the fusion results of the microscopic image of the present invention show great advantages at the subjective human perception and the objective evaluation. Furthermore, the present invention has simple calculation and stable result, is easy to be implemented and adapted for fusing the digital optical microscopic images which are shot by shallow depth of field.

12 Claims, 3 Drawing Sheets

▧ region growing image blocks
▨ region growing image blocks
▥ fuzzy seed blocks

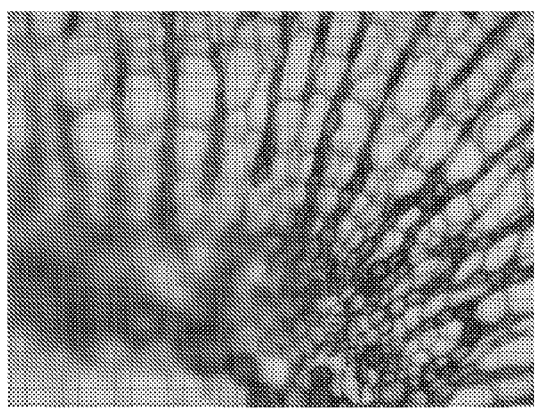 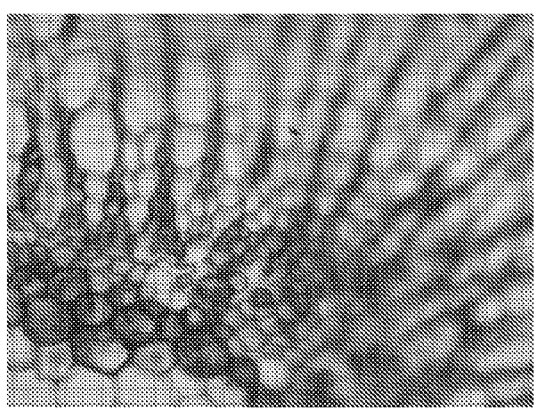
Fig. 3a  Fig. 3b
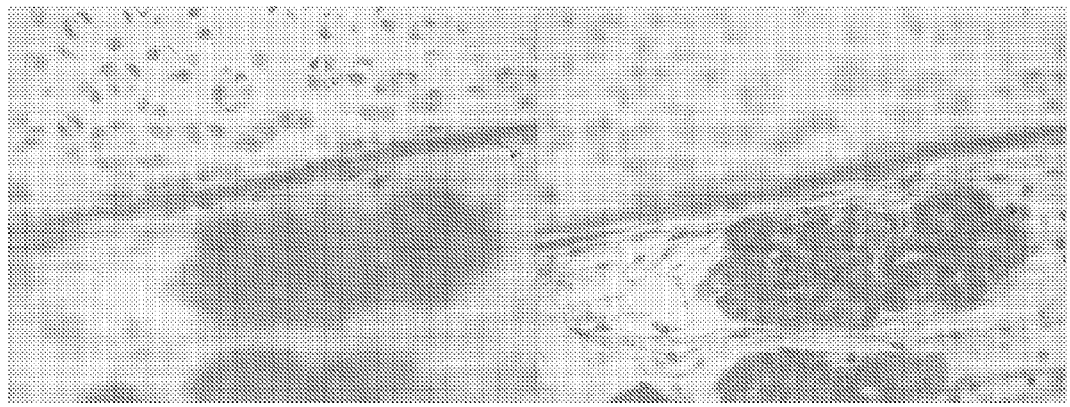
Fig. 3c  Fig. 3d
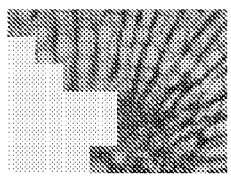 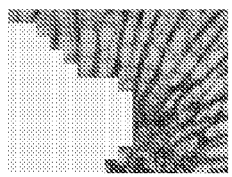  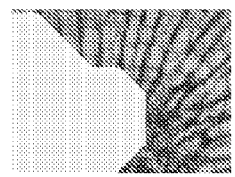
Fig. 4a  Fig. 4b  Fig. 4c  Fig. 4d
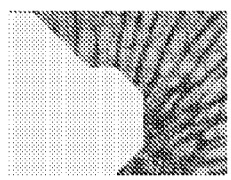 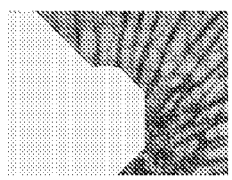 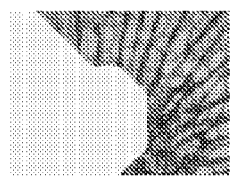 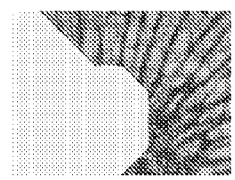
Fig. 4e  Fig. 4f  Fig. 4g  Fig. 4h

MICROSCOPIC IMAGE FUSION METHOD BASED ON REGION GROWING

BACKGROUND OF THE PRESENT INVENTION

1. Field of Invention

The present invention relates to an image processing technology, and more particularly to a microscopic image fusion method based on region growing.

2. Description of Related Arts

In the optical microscope imaging system, with the increase of the magnification, the depth of field is getting smaller and smaller. Therefore, only those targets at the focal plane or the vicinity thereof are clearly visible, so that even if it has the simplest structure and the relatively flat three-dimensional depth, it is impossible for the object to completely clearly focus in an image. In practical applications of many fields, it is required that the microscopic imaging should not only have high magnification, but also reach a sufficient depth of field, such as the fiber observation of textile industry and the quality inspection of printed circuit board industry. To resolve the above-mentioned technical problem, it is required that the focal length of the optical microscope should be constantly adjusted for obtaining a series of partially clear images, and then the series of partially clear images are inputted into a computer for fusing to obtain the complete and clear image of an object in the whole space. Therefore, the disadvantage that only one focal plane of an object is clearly visible while directly observing by an optical microscope, and the complete and clear image of the object in the whole space are invisible is overcome.

The existing image fusion method is mainly divided into three categories: the pixel-level image fusion method, the feature-level image fusion method and the decision-level image fusion method. The pixel-level image fusion method fuses on the foundation level. Its main advantage is that the fused image contains as many original data as possible, and the accuracy of the fusion is highest, thereby providing the detail information which other fusion levels cannot provide. In general, it processes pixels in the transform domain by means of the wavelet transform or other transformation methods, thus it has relatively higher fusion complexity. The feature-level image fusion method acquires the information from the pre-processed and feature-extracted original input image, such as the comprehensive treatment of the contour, shape, edge and region information. Generally, its implementation needs more empirical parameters. For variable objects, the instability of theirs feature extraction will bring the deviation to the fusion. The decision-level image fusion method makes the optimal fusion decision according to certain criteria and the feasible degree of every decision. However, due to a variety of decision criteria, it needs manual intervention and is difficult to achieve the automatic fusion.

SUMMARY OF THE PRESENT INVENTION

The technical problem to be resolved of the present invention is to provide a microscopic image fusion method based on region growing, which has simple calculation and stable results, and is capable of effectively improving the results of subjective perception and objective evaluation.

To resolve the above-mentioned technical problem, the technical solution of the present invention is described as follows. A microscopic image fusion method based on region growing is characterized by comprising steps of:

(1) setting $\{I_{S1}(x,y)\}$ to one microscopic image collected under an optical microscope, and setting $\{I_{S2}(x,y)\}$ to another microscopic image collected under the optical microscope, wherein $0 \leq x \leq W-1$, $0 \leq y \leq H-1$, W denotes the width of an image, H denotes the height of the image, $I_{S1}(x,y)$ denotes a pixel value of a pixel point whose coordinate position is (x,y) in the $\{I_{S1}(x,y)\}$, and $I_{S2}(x,y)$ denotes a pixel value of a pixel point whose coordinate position is (x,y) in the $\{I_{S2}(x,y)\}$;

(2) dividing the $\{I_{S1}(x,y)\}$ into $$\frac{W \times H}{n \times n}$$

non-overlapping first image blocks, each of which having a size of n×n, recording a first image block with a coordinate position of (i,j) in the $\{I_{S1}(x,y)\}$ as $I_{B1\_n}(i,j)$, dividing the $\{I_{S2}(x,y)\}$ into $$\frac{W \times H}{n \times n}$$

non-overlapping second image blocks, each of which having a size of n×n, and recording a second image block with a coordinate position of (i,j) in the $\{I_{S2}(x,y)\}$ as $I_{B2\_n}(i,j)$, wherein $$0 \leq i \leq \frac{W}{n} - 1, \ 0 \leq j \leq \frac{H}{n} - 1,$$

and n is 2-power;

(3) evaluating a definition of every first image block in the $\{I_{S1}(x,y)\}$ for obtaining a definition characteristic value corresponding to every first image block in the $\{I_{S1}(x,y)\}$, and recording a corresponding definition characteristic value thereof as $F_{v1\_n}(i,j)$ for the first image block $I_{B1\_n}(i,j)$ with the coordinate position of (i,j) in the $\{I_{S1}(x,y)\}$;

evaluating a definition of every second image block in the $\{I_{S2}(x,y)\}$ for obtaining a definition characteristic value corresponding to every second image block in the $\{I_{S2}(x,y)\}$, and recording a corresponding definition characteristic value thereof as $F_{v2\_n}(i,j)$ for the second image block $I_{B2\_n}(i,j)$ with the coordinate position of (i,j) in the $\{I_{S2}(x,y)\}$;

(4) determining a first decision threshold of the definition characteristic value corresponding to every first image block in the $\{I_{S1}(x,y)\}$, recording the first decision threshold as $T_{n\_1}$; and then judging whether every first image block in the $\{I_{S1}(x,y)\}$ is a fuzzy seed block according to the definition characteristic value corresponding to every first image block in the $\{I_{S1}(x,y)\}$ and the first decision threshold $T_{n\_1}$, wherein for the first image block $I_{B1\_n}(i,j)$ with the coordinate position of (i,j) in the $\{I_{S1}(x,y)\}$, judge whether the definition characteristic value $F_{v1\_n}(i,j)$ corresponding to the $I_{B1\_n}(i,j)$ is smaller than the first decision threshold $T_{n\_1}$, if it's OK, then judge the $I_{B1\_n}(i,j)$ as the fuzzy seed block and set a mark $M_{B1\_n}(i,j)$ of every pixel point in the $I_{B1\_n}(i,j)$ to 1, if not, judge the $I_{B1\_n}(i,j)$ as the non-fuzzy seed block and set the mark $M_{B1\_n}(i,j)$ of every pixel point in the $I_{B1\_n}(i,j)$ to 0; and then according to the mark $M_{B1\_n}(i,j)$ of every pixel point in every first image block in the $\{I_{S1}(x,y)\}$, calculating a definition tagged image corresponding to the $\{I_{S1}(x,y)\}$ and recording the definition tagged image as $\{I_{D1\_n}(x,y)\}$, wherein $I_{D1\_n}(x,y) = M_{B1\_n}(\text{int}(x/n), \text{int}(y/n))$, $I_{D1\_n}(x,y)$ denotes a mark of a pixel point with a coordinate position of (x,y) in the $\{I_{D1\_n}(x,y)\}$, and int( ) is a rounding operator;

determining a second decision threshold of the definition characteristic value corresponding to every second image block in the $\{I_{S2}(x,y)\}$, recording the second decision threshold as $T_{n\_2}$; and then judging whether every second image block in the $\{I_{S2}(x,y)\}$ is a fuzzy seed block according to the definition characteristic value corresponding to every second image block in the $\{I_{S2}(x,y)\}$ and the second decision threshold $T_{n\_2}$, wherein for the second image block $I_{B2\_n}(i,j)$ with the coordinate position of (i,j) in the $\{I_{S2}(x,y)\}$, judge whether the definition characteristic value $F_{v2\_n}(i,j)$ corresponding to the $I_{B2\_n}(i,j)$ is smaller than the second decision threshold $T_{n\_2}$, if it's OK, judge the $I_{B2\_n}(i,j)$ as the fuzzy seed block and set a mark $M_{B2\_n}(i,j)$ of every pixel point in the $I_{B2\_n}(i,j)$ to 1, if not, judge the $I_{B2\_n}(i,j)$ as the non-fuzzy seed block and set the mark $M_{B2\_n}(i,j)$ of every pixel point in the $I_{B2\_n}(i,j)$ to 0; and then according to the mark $M_{B2\_n}(i,j)$ of every pixel point in every second image block in the $\{I_{S2}(x,y)\}$, calculating a definition tagged image corresponding to the $\{I_{S2}(x,y)\}$ and recording the definition tagged image as $\{I_{D2\_n}(x,y)\}$, wherein $I_{D2\_n}(x,y)=M_{B2\_n}(\text{int}(x/n),\text{int}(y/n))$, $I_{D2\_n}(x,y)$ denotes a mark of a pixel point with a coordinate position of (x,y) in the $\{I_{D2\_n}(x,y)\}$, and int( ) is a rounding operator;

(5) setting n=128, n=64, n=32, n=16 and n=8, respectively repeating steps (3) to (4) for obtaining a definition tagged image $\{I_{D1\_128}(x,y)\}$ corresponding to the $\{I_{S1}(x,y)\}$ and a definition tagged image $\{I_{D2\_128}(x,y)\}$ corresponding to the $\{I_{S2}(x,y)\}$ while n=128; a definition tagged image $\{I_{D1\_64}(x,y)\}$ corresponding to the $\{I_{S1}(x,y)\}$ and a definition tagged image $\{I_{D2\_64}(x,y)\}$ corresponding to the $\{I_{S2}(x,y)\}$ while n=64; a definition tagged image $\{I_{D1\_32}(x,y)\}$ corresponding to the $\{I_{S1}(x,y)\}$ and a definition tagged image $\{I_{D2\_32}(x,y)\}$ corresponding to the $\{I_{S2}(x,y)\}$ while n=32; a definition tagged image $\{I_{D1\_16}(x,y)\}$ corresponding to the $\{I_{S1}(x,y)\}$ and a definition tagged image $\{I_{D2\_16}(x,y)\}$ corresponding to the $\{I_{S2}(x,y)\}$ while n=16; a definition tagged image $\{I_{D1\_8}(x,y)\}$ corresponding to the $\{I_{S1}(x,y)\}$ and a definition tagged image $\{I_{D2\_8}(x,y)\}$ corresponding to the $\{I_{S2}(x,y)\}$ while n=8;

(6) based on the pixel points with the mark of 1 in the $\{I_{D1\_128}(x,y)\}$, $\{I_{D1\_64}(x,y)\}$, $\{I_{D1\_32}(x,y)\}$, $\{I_{D1\_16}(x,y)\}$ and $\{I_{D1\_8}(x,y)\}$, making a fuzzy region growing for obtaining a region growing image corresponding to the $\{I_{S1}(x,y)\}$ and recording the region growing image as $\{I_{G1}(x,y)\}$, wherein $I_{G1}(x,y)$ denotes a mark of a pixel point with a coordinate position of (x,y) in the $\{I_{G1}(x,y)\}$;

based on the pixel points with the mark of 1 in the $\{I_{D2\_128}(x,y)\}$, $\{I_{D2\_64}(x,y)\}$, $\{I_{D2\_32}(x,y)\}$, $\{I_{D2\_16}(x,y)\}$ and $\{I_{D2\_8}(x,y)\}$, making a fuzzy region growing for obtaining a region growing image corresponding to the $\{I_{S2}(x,y)\}$ and recording the region growing image as $I_{G2}(x,y)$, wherein $I_{G2}(x,y)$ denotes a mark of a pixel point with a coordinate position of (x,y) in the $\{I_{G2}(x,y)\}$; and (7) according to the region growing image $\{I_{G1}(x,y)\}$ corresponding to the $\{I_{S1}(x,y)\}$ and the region growing image $\{I_{G2}(x,y)\}$ corresponding to the $\{I_{S2}(x,y)\}$, fusing the $\{I_{S1}(x,y)\}$ and the $\{I_{S2}(x,y)\}$ for obtaining a final fusion microscopic image and recording the final fusion microscopic image as $\{I_F(x,y)\}$, wherein $$I_F(x,y) = \begin{cases} I_{S1}(x,y), & \text{if } I_{G1}(x,y)=0 \text{ and } I_{G2}(x,y)=1 \\ I_{S2}(x,y), & \text{if } I_{G1}(x,y)=1 \text{ and } I_{G2}(x,y)=0 \\ C & \text{if } I_{G1}(x,y)=I_{G2}(x,y), \end{cases}$$

here, $I_F(x,y)$ denotes a pixel value of a pixel point with a coordinate position of (x,y) in the $\{I_F(x,y)\}$, $$C = \begin{cases} I_{S1}(x,y), & \text{if } C_{nt1}(x,y) < C_{nt2}(x,y) \\ I_{S2}(x,y), & \text{if } C_{nt1}(x,y) > C_{nt2}(x,y) \\ \dfrac{I_{S1}(x,y)+I_{S2}(x,y)}{2}, & \text{if } C_{nt1}(x,y) = C_{nt2}(x,y), \end{cases}$$

$C_{nt1}(x,y)$ denotes an amount of pixel points with a mark of 1 in an 8 neighbor of the pixel point with a coordinate position of (x,y) in the $\{I_{G1}(x,y)\}$, and $C_{nt2}(x,y)$ denotes an amount of pixel points with a mark of 1 in an 8 neighbor of the pixel point with a coordinate position of (x,y) in the $\{I_{G2}(x,y)\}$.

In step (3), the concrete process of calculating the definition characteristic value $F_{v1\_n}(i,j)$ corresponding to the first image block $I_{B1\_n}(i,j)$ with the coordinate position of (i,j) in the $\{I_{S1}(x,y)\}$ comprises steps of: (3-a1) using the improved TenenGrad gradient function to calculate a horizontal gradient and a vertical gradient of every pixel point in the $I_{B1\_n}(i,j)$, wherein for a pixel point with a coordinate position of $(x_1,y_1)$ in the $I_{B1\_n}(i,j)$, respectively record the horizontal gradient and the vertical gradient thereof as $G_{h1}(x_1,y_1)$ and $G_{v1}(x_1,y_1)$, wherein $G_{h1}(x_1,y_1)=(f_1(x_1-1,y_1-1)+2f_1(x_1,y_1-1)+f_1(x_1+1,y_1-1))-(f_1(x_1-1,y_1+1)+2f_1(x_1,y_1+1)+f_1(x_1+1,y_1+1))$, $G_{v1}(x_1,y_1)=(f_1(x_1+1,y_1-1)+2f_1(x_1+1,y_1)+f_1(x_1+1,y_1+1))-(f_1(x_1-1,y_1-1)+2f_1(x_1-1,y_1)+f_1(x_1-1,y_1+1))$, here, $0 \leq x_1 \leq n-1$, $0 \leq y_1 \leq n-1$, $f_1(x_1-1,y_1-1)$ denotes a pixel value of a pixel point with a coordinate position of $(x_1-1,y_1-1)$ in the $I_{B1\_n}(i,j)$, $f_1(x_1,y_1-1)$ denotes a pixel value of a pixel point with a coordinate position of $(x_1,y_1-1)$ in the $I_{B1\_n}(i,j)$, $f_1(x_1+1,y_1-1)$ denotes a pixel value of a pixel point with a coordinate position of $(x_1+1,y_1-1)$ in the $I_{B1\_n}(i,j)$, $f_1(x_1-1,y_1+1)$ denotes a pixel value of a pixel point with a coordinate position of $(x_1-1,y_1+1)$ in the $I_{B1\_n}(i,j)$, $f_1(x_1,y_1+1)$ denotes a pixel value of a pixel point with a coordinate position of $(x_1,y_1+1)$ in the $I_{B1\_n}(i,j)$, $f_1(x_1+1,y_1+1)$ denotes a pixel value of a pixel point with a coordinate position of $(x_1+1,y_1+1)$ in the $I_{B1\_n}(i,j)$, $f_1(x_1+1,y_1)$ denotes a pixel value of a pixel point with a coordinate position of $(x_1+1,y_1)$ in the $I_{B1\_n}(i,j)$, and $f_1(x_1-1,y_1)$ denotes a pixel value of a pixel point with a coordinate position of $(x_1-1,y_1)$ in the $I_{B1\_n}(i,j)$; and (3-a2) according to the horizontal gradient and the vertical gradient of every pixel point in the $I_{B1\_n}(i,j)$, calculating the definition characteristic value $F_{v1\_n}(i,j)$ corresponding to the $I_{B1\_n}(i,j)$, wherein, $$F_{v1\_n}(i,j) = \sum_{x1=0}^{n-1} \sum_{y1=0}^{n-1} (G_{v1}^2(x_1,y_1) + G_{h1}^2(x1,y1)).$$

In step (3), the concrete process of calculating the definition characteristic value $F_{v2\_n}(i,j)$ corresponding to the second image block $I_{B2\_n}(i,j)$ with the coordinate position of (i,j) in the $\{I_{S2}(x,y)\}$ comprises steps of: (3-b1) using the improved TenenGrad gradient function to calculate a horizontal gradient and a vertical gradient of every pixel point in the $I_{B2\_n}(i,j)$, wherein for a pixel point with a coordinate position of $(x_1,y_1)$ in the $I_{B2\_n}(i,j)$, respectively record the horizontal gradient and the vertical gradient thereof as $G_{h2}(x_1,y_1)$ and $G_{v2}(x_1,y_1)$, wherein $G_{h2}(x_1,y_1)=(f_2(x_1-1,y_1-1)+2f_2(x_1,y_1-1)+f_2(x_1+1,y_1-1))-(f_2(x_1-1,y_1+1)+2f_2(x_1,y_1+1)+f_2(x_1+1,y_1+1))$, $G_{v2}(x_1,y_1)=(f_2(x_1+1,y_1-1)+2f_2(x_1+1,y_1)+f_2(x_1+1,y_1+1))-(f_2(x_1-1,y_1-1)+2f_2(x_1-1,y_1)+f_2(x_1-1,y_1+1))$ here, $0 \leq x_1 \leq n-1$, $0 \leq y_1 \leq n-1$, $f_2(x_1-1,y_1-1)$ denotes a pixel value of a pixel point with a coordinate position of $(x_1-1, y_1-1)$ in the $I_{B2\_n}(i,j)$, $f_2(x_1,y_1-1)$ denotes a pixel value of a pixel point with a coordinate position of $(x_1,y_1-1)$ in the $I_{B2\_n}(i,j)$, $f_2(x_1+1,y_1-1)$ denotes a pixel value of a pixel point with a coordinate position of $(x_1+1, y_1-1)$ in the $I_{B2\_n}(i,j)$, $f_2(x_1-1, y_1+1)$ denotes a pixel value of a pixel point with a coordinate position of $(x_1-1,y_1+1)$ in the $I_{B2\_n}(i,j)$, $f_2(x_1,y_1+1)$ denotes a pixel value of a pixel point with a coordinate position of $(x_1,y_1+1)$ in the $I_{B2\_n}(i,j)$, $f_2(x_1+1,y_1+1)$ denotes a pixel value of a pixel point with a coordinate position of $(x_1+1,y_1+1)$ in the $I_{B2\_n}(i,j)$, $f_2(x_1+1,y_1)$ denotes a pixel value of a pixel point with a coordinate position of $(x_1+1,y_1)$ in the $I_{B2\_n}(i,j)$, and $f_2(x_1-1,y_1)$ denotes a pixel value of a pixel point with a coordinate position of $(x_1-1,y_1)$ in the $I_{B2\_n}(i,j)$; and (3-b2) according to the horizontal gradient and the vertical gradient of every pixel point in the $I_{B2\_n}(i,j)$, calculating the definition characteristic value $F_{v2\_n}(i,j)$ corresponding to the $I_{B2\_n}(i,j)$, wherein, $$F_{v2\_n}(i, j) = \sum_{x1=0}^{n-1} \sum_{y1=0}^{n-1} (G_{v2}^2(x_1, y_1) + G_{h2}^2(x1, y1)).$$

In step (4), the concrete process of determining the first decision threshold $T_{n\_1}$ of the definition characteristic value corresponding to every first image block in the $\{I_{S1}(x,y)\}$ comprises steps of: (4-a1) sequencing the definition characteristic value corresponding to every first image block in the $\{I_{S1}(x,y)\}$, finding out a maximum definition characteristic value and a minimum characteristic value, and respectively recording the maximum definition characteristic value and the minimum characteristic value as $F_{v1\_n\_MAX}$ and $F_{v1\_n\_MIN}$; and (4-a2) calculating the first decision threshold $T_{n\_1}$, wherein $T_{n\_1}=F_{v1\_n\_MIN}+(F_{v1\_n\_MAX}-F_{v1\_n\_MIN})\cdot w_1$, here, $w_1$ is a weight factor.

In step (4), the concrete process of determining the second decision threshold $T_{n\_2}$ of the definition characteristic value corresponding to every second image block in the $\{I_{S2}(x,y)\}$ comprises steps of: (4-b1) sequencing the definition characteristic value corresponding to every second image block in the $\{I_{S2}(x,y)\}$, finding out a maximum definition characteristic value and a minimum characteristic value, and respectively recording the maximum definition characteristic value and the minimum characteristic value as $F_{v2\_n\_MAX}$ and $F_{v2\_n\_MIN}$; and (4-b2) calculating the second decision threshold $T_{n\_2}$, wherein $T_{n\_2}=F_{v2\_n\_MIN}+(F_{v2\_n\_MAX}-F_{v2\_n\_MIN})\times w_2$, here, $w_2$ is a weight factor.

In (4-a2) of step (4), $0.4 \leq w_1 \leq 0.6$; and in (4-b2) of step (4), $0.4 \leq w_2 \leq 0.6$.

In step (6), the acquisition process of the region growing image $\{I_{G1}(x,y)\}$ corresponding to the $\{I_{S1}(x,y)\}$ comprises steps of: (6-a1) while n=128, regarding the definition tagged image $\{I_{D1\_128}(x,y)\}$ corresponding to the $\{I_{S1}(x,y)\}$ as a starting seed image; (6-a2) studying 8 image blocks each of which having a size of $$\frac{n}{2} \times \frac{n}{2}$$

adjacent to every fuzzy seed block with the size of n×n in the $\{I_{S1}(x,y)\}$, wherein if the mark $$I_{D1\_\frac{n}{2}}(x, y)$$

corresponding to every pixel point in the image block with the size of $$\frac{n}{2} \times \frac{n}{2}$$

adjacent to every fuzzy seed block with the size of n×n in $\{I_{S1}(x,y)\}$ is 1, then a mark of every pixel point in the image block with the size of $$\frac{n}{2} \times \frac{n}{2}$$

at the same position in the starting seed image is set to 1; (6-a3) setting $$n = \frac{n}{2};$$

and returning to step (6-a2) till n=8, here, "=" is an assignment symbol in $$n = \frac{n}{2};$$

and (6-a4) while n=8, directly setting a mark of every pixel point in image blocks in the starting seed image to 1, wherein the image blocks in the starting seed image has the same position with 8 image blocks, each of which having a size of 4×4, adjacent to every fuzzy seed block with a size of 8×8 in the $\{I_{S1}(x,y)\}$; and then setting n=4, and directly setting a mark of every pixel point in image blocks in the starting seed image to 1, wherein the image blocks in the starting seed image has the same position with 8 image blocks, each of which having a size of 2×2, adjacent to every fuzzy seed block with a size of 4×4 in the $\{I_{S1}(x,y)\}$; and then setting n=2, and directly setting the mark of 8 pixel points in the starting seed image to 1, wherein the 8 pixel points in the starting seed image has the same position with the 8 pixel points adjacent to every fuzzy seed block with a size of 2×2 in the $\{I_{S1}(x,y)\}$, thereby obtaining the region growing image $\{I_{G1}(x,y)\}$ corresponding to the $\{I_{S1}(x,y)\}$, wherein the pixel point in $\{I_{S1}(x,y)\}$ whose corresponding mark in $\{I_{G1}(x,y)\}$ is 1 is a fuzzy pixel point, and the pixel point in $\{I_{S1}(x,y)\}$ whose corresponding mark in $\{I_{G1}(x,y)\}$ is 0 is a non-fuzzy pixel point.

In step (6), the acquisition process of the region growing image $\{I_{G2}(x,y)\}$ corresponding to the $\{I_{S2}(x,y)\}$ comprises steps of: (6-b1) while n=128, regarding the definition tagged image $\{I_{D2\_128}(x,y)\}$ corresponding to the $\{I_{S2}(x,y)\}$ as a starting seed image; (6-b2) studying 8 image blocks each of which having a size of $$\frac{n}{2} \times \frac{n}{2}$$

adjacent to every fuzzy seed block with the size of n×n in the $\{I_{S2}(x,y)\}$, wherein if the mark of $I_{D2\_\frac{n}{2}}(x, y)$ corresponding to every pixel point in the image block with the size of $$\frac{n}{2} \times \frac{n}{2}$$

adjacent to every fuzzy seed block with the size of n×n in $\{I_{S2}(x,y)\}$ is 1, then a mark of every pixel point in the image block with the size of $$\frac{n}{2} \times \frac{n}{2}$$

at the same position in the starting seed image is set to 1; (6-b3) setting $$n = \frac{n}{2},$$

and returning to step (6-b2) till n=8, here, "=" is an assignment symbol in $$n = \frac{n}{2};$$

and (6-b4) while n=8, directly setting a mark of every pixel point in image blocks in the starting seed image to 1, wherein the image blocks in the starting seed image has the same position with 8 image blocks, each of which having a size of, 4×4 adjacent to every fuzzy seed block with a size of 8×8 in the $\{I_{S2}(x,y)\}$; and then setting n=4, and directly setting a mark of every pixel point in image blocks in the starting seed image to 1, wherein the image blocks in the starting seed image has the same position with 8 image blocks, each of which having a size of 2×2, adjacent to every fuzzy seed block with a size of 4×4 in the $\{I_{S2}(x,y)\}$; and then setting n=2, and directly setting the mark of 8 pixel points in the starting seed image to 1, wherein the 8 pixel points in the starting seed image has the same position with the 8 pixel points adjacent to every fuzzy seed block with a size of 2×2 in the $\{I_{S2}(x,y)\}$, thereby obtaining the region growing image $\{I_{G2}(x,y)\}$ corresponding to the $\{I_{S2}(x,y)\}$, wherein the pixel point in $\{I_{S2}(x,y)\}$ whose corresponding mark in $\{I_{G2}(x,y)\}$ is 1 is a fuzzy pixel point, and the pixel point in $\{I_{S2}(x,y)\}$ whose corresponding mark in $\{I_{G2}(x,y)\}$ is 0 is a non-fuzzy pixel point.

Compared with the prior art, the present invention has some advantages as follows. By evaluating the definition of every image block in the microscopic image, the fuzzy degree of the microscopic image is judged and the fuzzy seed block is determined. Then, the region growing is used to progressively complete the accurate segmentation of the fuzzy region and the clear region. Finally, by the fusion rule of the microscopic image, a clear and high-quality microscopic image fused by a plurality of microscopic images is obtained. Due to the combination of the definition evaluation of the microscopic image, and the segmentation of the fuzzy region and clear region of every microscopic image by the region growing, the fusion result of the microscopic image of the present invention shows great advantages at the subjective human perception and the objective evaluation. Furthermore, the present invention has simple calculation and stable result, is easy to be implemented and adapted for fusing the digital optical microscopic images which are shot by shallow depth of field.

These and other objectives, features, and advantages of the present invention will become apparent from the following detailed description, the accompanying drawings, and the appended claims.

BRIEF DESCRIPTION OF THE DRAWINGS

FIG. 3a is the first microscopic image of the cross section of the dicotyledonous stem.
FIG. 3b is the second microscopic image of the cross section of the dicotyledonous stem.
FIG. 3c is the first microscopic image of the epithelial tissue.
FIG. 3d is the second microscopic image of the epithelial tissue.
FIG. 4a shows the microscopic image whose definition is judged after the microscopic image shown in FIG. 3a is divided into 128×128 image blocks, wherein the white part at the left is the eliminated fuzzy region which is marked by $\{I_{D1\_128}(x,y)\}$.
FIG. 4b shows the rest microscopic image after the fuzzy region growing of the image block with the size of 64×64 shown in FIG. 4a.
FIG. 4c shows the rest microscopic image after the fuzzy region growing of the image block with the size of 32×32 shown in FIG. 4b.
FIG. 4d shows the rest microscopic image after the fuzzy region growing of the image block with the size of 16×16 shown in FIG. 4c.
FIG. 4e shows the rest microscopic image after the fuzzy region growing of the image block with the size of 8×8 shown in FIG. 4d.
FIG. 4f shows the rest microscopic image after the fuzzy region growing of the image block with the size of 4×4 shown in FIG. 4e.
FIG. 4g shows the rest microscopic image after the fuzzy region growing of the image block with the size of 2×2 shown in FIG. 4f.
FIG. 4h shows the rest microscopic image after the fuzzy region growing of the image block with the size of 1×1 shown in FIG. 4g.

DETAILED DESCRIPTION OF THE PREFERRED EMBODIMENT

Figure 1:
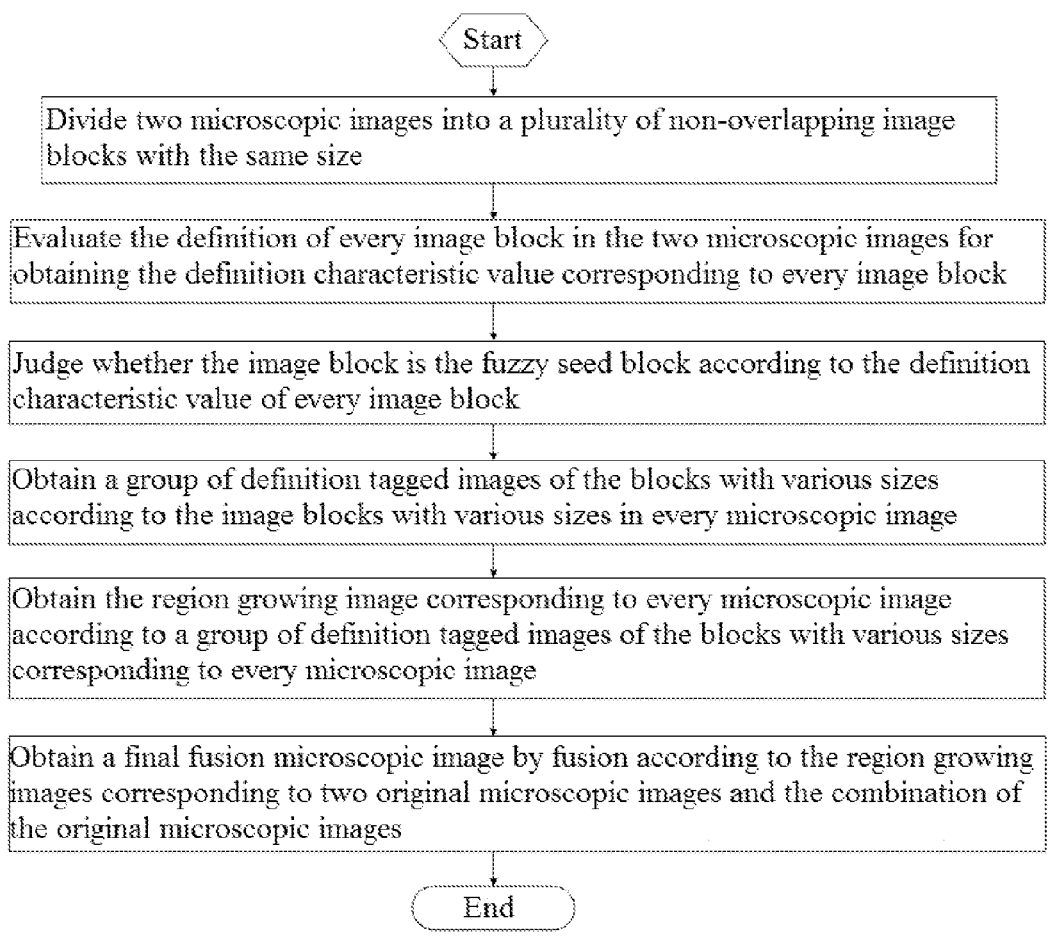
FIG. 1 is a general block diagram of the present invention.

The present invention is further explained in detail with the accompanying drawings.
FIG. 1 shows a flow chart of a microscopic image fusion method based on region growing provided by the present invention. The microscopic image fusion method based on region growing comprises steps as follows.
(1) Set $\{I_{S1}(x,y)\}$ to one microscopic image collected under an optical microscope, and set $\{I_{S2}(x,y)\}$ to another microscopic image collected under the optical microscope, wherein $0 \leq x \leq W-1$, $0 \leq y \leq H-1$, W denotes the width of an image, H denotes the height of the image, $I_{S1}(x,y)$ denotes a pixel value of a pixel point whose coordinate position is (x,y) in the $\{I_{S1}(x,y)\}$, and $I_{S2}(x,y)$ denotes a pixel value of a pixel point whose coordinate position is (x,y) in the $\{I_{S2}(x,y)\}$.

To verify the validity of the present invention, two pairs of microscopic images which are shot under the condition of shallow depth of field of the optical microscope are selected in this embodiment, as shown in FIG. 3, wherein FIGS. 3a and 3b are two microscopic images of the cross section of the dicotyledonous stem, FIGS. 3c and 3d are two microscopic images of the epithelial tissue. These images are with the size of 1024×768. It is seen that each of them has some blurring regions. In this embodiment, the microscopic image shown by FIG. 3a is $\{I_{S1}(x,y)\}$, and the microscopic image shown by FIG. 3b is $\{I_{S2}(x,y)\}$. Similarly, the microscopic image shown by FIG. 3c is $\{I_{S1}(x,y)\}$, and the microscopic image shown by FIG. 3d is $\{I_{S2}(x,y)\}$.

(2) Divide the $\{I_{S1}(x,y)\}$ into $$\frac{W \times H}{n \times n}$$

non-overlapping first image blocks, each of which having a size of n×n, record a first image block with a coordinate position of (i,j) in the $\{I_{S1}(x,y)\}$ as $I_{B1\_n}(i,j)$, divide the $\{I_{S2}(x,y)\}$ into $$\frac{W \times H}{n \times n}$$

non-overlapping second image blocks, each of which having a size of n×n, and record a second image block with a coordinate position of (i,j) in the $\{I_{S2}(x,y)\}$ as $I_{B2\_n}(i,j)$, wherein $$0 \le i \le \frac{W}{n} - 1, 0 \le j \le \frac{H}{n} - 1,$$

and n is 2-power.

(3) Evaluate a definition of every first image block in the $\{I_{S1}(x,y)\}$ for obtaining a definition characteristic value corresponding to every first image block in the $\{I_{S1}(x,y)\}$, and record a corresponding definition characteristic value thereof as $F_{v1\_n}(i,j)$ for the first image block $I_{B1\_n}(i,j)$ with the coordinate position of (i,j) in the $\{I_{S1}(x,y)\}$. In the specific embodiment, the concrete process of calculating the definition characteristic value $F_{v1\_n}(i,j)$ corresponding to the first image block $I_{B1\_n}(i,j)$ with the coordinate position of (i,j) in the $\{I_{S1}(x,y)\}$ comprises steps of: (3-a1) using the improved TenenGrad gradient function to calculate a horizontal gradient and a vertical gradient of every pixel point in the $I_{B1\_n}(i,j)$, wherein for a pixel point with a coordinate position of $(x_1,y_1)$ in the $I_{B1\_n}(i,j)$, respectively record the horizontal gradient and the vertical gradient thereof as $G_{h1}(x_1,y_1)$ and $G_{v1}(x_1,y_1)$, wherein $$G_{h1}(x_1,y_1)=(f_1(x_1-1,y_1-1)+2f_1(x_1,y_1-1)+f_1(x_1+1,y_1-1))-(f_1(x_1-1,y_1+1)+2f_1(x_1,y_1+1)+f_1(x_1+1,y_1+1)),$$

$$G_{v1}(x_1,y_1)=(f_1(x_1+1,y_1-1)+2f_1(x_1+1,y_1)+f_1(x_1+1,y_1+1))-(f_1(x_1-1,y_1-1)+2f_1(x_1-1,y_1)+f_1(x_1-1,y_1+1)),$$

here, $0 \le x_1 \le n-1$, $0 \le y_1 \le n-1$, $f_1(x_1-1,y_1-1)$ denotes a pixel value of a pixel point with a coordinate position of $(x_1-1,y_1-1)$ in the $I_{B1\_n}(i,j)$, $f_1(x_1,y_1-1)$ denotes a pixel value of a pixel point with a coordinate position of $(x_1,y_1-1)$ in the $I_{B1\_n}(i,j)$, $f_1(x_1+1,y_1-1)$ denotes a pixel value of a pixel point with a coordinate position of $(x_1+1,y_1-1)$ in the $I_{B1\_n}(i,j)$, $f_1(x_1-1,y_1+1)$ denotes a pixel value of a pixel point with a coordinate position of $(x_1-1,y_1+1)$ in the $I_{B1\_n}(i,j)$, $f_1(x_1,y_1+1)$ denotes a pixel value of a pixel point with a coordinate position of $(x_1,y_1+1)$ in the $I_{B1\_n}(i,j)$, $f_1(x_1+1,y_1+1)$ denotes a pixel value of a pixel point with a coordinate position of $(x_1+1,y_1+1)$ in the $I_{B1\_n}(i,j)$, $f_1(x_1+1,y_1)$ denotes a pixel value of a pixel point with a coordinate position of $(x_1+1,y_1)$ in the $I_{B1\_n}(i,j)$, and $f_1(x_1-1,y_1)$ denotes a pixel value of a pixel point with a coordinate position of $(x_1-1,y_1)$ in the $I_{B1\_n}(i,j)$; and (3-a2) according to the horizontal gradient and the vertical gradient of every pixel point in the $I_{B1\_n}(i,j)$, calculating the definition characteristic value $F_{v1\_n}(i,j)$ corresponding to the $I_{B1\_n}(i,j)$, namely, summing total sums of squares of the horizontal gradient and the vertical gradient of every pixel point in the $I_{B1\_n}(i,j)$ for obtaining the definition characteristic value $F_{v1\_n}(i,j)$ corresponding to the $I_{B1\_n}(i,j)$, wherein, $$F_{v1\_n}(i,j) = \sum_{x1=0}^{n-1} \sum_{y1=0}^{n-1} (G_{v1}^2(x_1,y_1) + G_{h1}^2(x1,y1)).$$

Evaluate a definition of every second image block in the $\{I_{S2}(x,y)\}$ for obtaining a definition characteristic value corresponding to every second image block in the $\{I_{S2}(x,y)\}$, and record a corresponding definition characteristic value thereof as $F_{v2\_n}(i,j)$ for the second image block $I_{B2\_n}(i,j)$ with the coordinate position of (i,j) in the $\{I_{S2}(x,y)\}$. In the specific embodiment, the concrete process of calculating the definition characteristic value $F_{v2\_n}(i,j)$ corresponding to the second image block $I_{B2\_n}(i,j)$ with the coordinate position of (i,j) in the $\{I_{S2}(x,y)\}$ comprises steps of: (3-b1) using the improved TenenGrad gradient function to calculate a horizontal gradient and a vertical gradient of every pixel point in the $I_{B2\_n}(i,j)$, wherein for a pixel point with a coordinate position of $(x_1,y_1)$ in the $I_{B2\_n}(i,j)$, respectively record the horizontal gradient and the vertical gradient thereof as $G_{h2}(x_1,y_1)$ and $G_{v2}(x_1,y_1)$, wherein $$G_{h2}(x_1,y_1)=(f_2(x_1-1,y_1-1)+2f_2(x_1,y_1-1)+f_2(x_1+1,y_1-1))-(f_2(x_1-1,y_1+1)+2f_2(x_1,y_1+1)+f_2(x_1+1,y_1+1)),$$

$$G_{v2}(x_1,y_1)=(f_2(x_1+1,y_1-1)+2f_2(x_1+1,y_1)+f_2(x_1+1,y_1+1))-(f_2(x_1-1,y_1-1)+2f_2(x_1-1,y_1)+f_2(x_1-1,y_1+1))$$

here, $0 \le x_1 \le n-1$, $0 \le y_1 \le n-1$, $f_2(x_1-1,y_1-1)$ denotes a pixel value of a pixel point with a coordinate position of $(x_1-1,y_1-1)$ in the $I_{B2\_n}(i,j)$, $f_2(x_1,y_1-1)$ denotes a pixel value of a pixel point with a coordinate position of $(x_1,y_1-1)$ in the $I_{B2\_n}(i,j)$, $f_2(x_1+1,y_1-1)$ denotes a pixel value of a pixel point with a coordinate position of $(x_1+1,y_1-1)$ in the $I_{B2\_n}(i,j)$, $f_2(x_1-1,y_1+1)$ denotes a pixel value of a pixel point with a coordinate position of $(x_1-1,y_1+1)$ in the $I_{B2\_n}(i,j)$, $f_2(x_1,y_1+1)$ denotes a pixel value of a pixel point with a coordinate position of $(x_1,y_1+1)$ in the $I_{B2\_n}(i,j)$, $f_2(x_1+1,y_1+1)$ denotes a pixel value of a pixel point with a coordinate position of $(x_1+1,y_1+1)$ in the $I_{B2\_n}(i,j)$, $f_2(x_1+1,y_1)$ denotes a pixel value of a pixel point with a coordinate position of $(x_1+1,y_1)$ in the $I_{B2\_n}(i,j)$, and $f_2(x_1-1,y_1)$ denotes a pixel value of a pixel point with a coordinate position of $(x_1-1,y_1)$ in the $I_{B2\_n}(i,j)$; and (3-b2) according to the horizontal gradient and the vertical gradient of every pixel point in the $I_{B2\_n}(i,j)$, calculating the definition characteristic value $F_{v2\_n}(i,j)$ corresponding to the $I_{B2\_n}(i,j)$, namely, summing total sums of squares of the horizontal gradient and the vertical gradient of every pixel point in the $I_{B2\_n}(i,j)$ for obtaining the definition characteristic value $F_{v2\_n}(i,j)$ corresponding to the $I_{B2\_n}(i,j)$, wherein, $$F_{v2\_n}(i,j) = \sum_{x1=0}^{n-1} \sum_{y1=0}^{n-1} (G_{v2}^2(x_1, y_1) + G_{h2}^2(x1, y1)).$$

(4) Determine a first decision threshold of the definition characteristic value corresponding to every first image block in the $\{I_{S1}(x,y)\}$, record the first decision threshold as $T_{n\_1}$; and then judge whether every first image block in the $\{I_{S1}(x,y)\}$ is a fuzzy seed block according to the definition characteristic value corresponding to every first image block in the $\{I_{S1}(x,y)\}$ and the first decision threshold $T_{n\_1}$, wherein for the first image block $I_{B1\_n}(i,j)$ with the coordinate position of (i,j) in the $\{I_{S1}(x,y)\}$, judge whether the definition characteristic value $F_{v1\_n}(i,j)$ corresponding to the $I_{B1\_n}(i,j)$ is smaller than the first decision threshold $T_{n\_1}$, if it's OK, then judge the $I_{B1\_n}(i,j)$ as the fuzzy seed block and set a mark $M_{B1\_n}(i,j)$ of every pixel point in the $I_{B1\_n}(i,j)$ to 1, if not, judge the $I_{B1\_n}(i,j)$ as the non-fuzzy seed block and set the mark $M_{B1\_n}(i,j)$ of every pixel point in the $I_{B1\_n}(i,j)$ to 0, namely, $$M_{B1\_n}(i,j) = \begin{cases} 1, & \text{if } F_{v1\_n}(i,j) < T_{n\_1} \\ 0, & \text{otherwise;} \end{cases}$$

and then according to the mark $M_{B1\_n}(i,j)$ of every pixel point in every first image block in the $\{I_{S1}(x,y)\}$, calculate a definition tagged image corresponding to the $\{I_{S1}(x,y)\}$ and record the definition tagged image as $\{I_{D1\_n}(x,y)\}$, wherein $I_{D1\_n}(x,y) = M_{B1\_n}(\text{int}(x/n), \text{int}(y/n))$, $I_{D1\_n}(x,y)$ denotes a mark of a pixel point with a coordinate position of (x,y) in the $\{I_{D1\_n}(x,y)\}$, and int( ) is a rounding operator.

In the specific embodiment, the concrete process of determining the first decision threshold $T_{n\_1}$ of the definition characteristic value corresponding to every first image block in the $\{I_{S1}(x,y)\}$ comprises steps of: (4-a1) sequencing the definition characteristic value corresponding to every first image block in the $\{I_{S1}(x,y)\}$, finding out a maximum definition characteristic value and a minimum characteristic value, and respectively recording the maximum definition characteristic value and the minimum characteristic value as $F_{v1\_n\_MAX}$ and $F_{v1\_n\_MIN}$; and (4-a2) calculating the first decision threshold $T_{n\_1}$, wherein $T_{n\_1} = F_{v1\_n\_MIN} + (F_{v1\_n\_MAX} - F_{v1\_n\_MIN}) \times w_1$, here, $w_1$ is a weight factor.

Determine a second decision threshold of the definition characteristic value corresponding to every second image block in the $\{I_{S2}(x,y)\}$, record the second decision threshold as $T_{n\_2}$; and then judge whether every second image block in the $\{I_{S2}(x,y)\}$ is a fuzzy seed block according to the definition characteristic value corresponding to every second image block in the $\{I_{S2}(x,y)\}$ and the second decision threshold $T_{n\_2}$, wherein for the second image block $I_{B2\_n}(i,j)$ with the coordinate position of (i,j) in the $\{I_{S2}(x,y)\}$, judge whether the definition characteristic value $F_{v2\_n}(i,j)$ corresponding to the $I_{B2\_n}(i,j)$ is smaller than the second decision threshold $T_{n\_2}$, if it's OK, judge the $I_{B2\_n}(i,j)$ as the fuzzy seed block and set a mark $M_{B2\_n}(i,j)$ of every pixel point in the $I_{B2\_n}(i,j)$ to 1, if not, judge the $I_{B2\_n}(i,j)$ as the non-fuzzy seed block and set the mark $M_{B2\_n}(i,j)$ of every pixel point in the $I_{B2\_n}(i,j)$ to 0, namely, $$M_{B2\_n}(i,j) = \begin{cases} 1, & \text{if } F_{v2\_n}(i,j) < T_{n\_2} \\ 0, & \text{otherwise;} \end{cases}$$

and then according to the mark $M_{B2\_n}(i,j)$ of every pixel point in every second image block in the $\{I_{S2}(x,y)\}$, calculate a definition tagged image corresponding to the $\{I_{S2}(x,y)\}$ and record the definition tagged image as $\{I_{D2\_n}(x,y)\}$, wherein $I_{D2\_n}(x,y) = M_{B2\_n}(\text{int}(x/n), \text{int}(y/n))$, $I_{D2\_n}(x,y)$ denotes a mark of a pixel point with a coordinate position of (x,y) in the $\{I_{D2\_n}(x,y)\}$, and int( ) is a rounding operator.

In the specific embodiment, the concrete process of determining the second decision threshold $T_{n\_2}$ of the definition characteristic value corresponding to every second image block in the $\{I_{S2}(x,y)\}$ comprises steps of: (4-b1) sequencing the definition characteristic value corresponding to every second image block in the $\{I_{S2}(x,y)\}$, finding out a maximum definition characteristic value and a minimum characteristic value, and respectively recording the maximum definition characteristic value and the minimum characteristic value as $F_{v2\_n\_MAX}$ and $F_{v2\_n\_MIN}$; and (4-b2) calculating the second decision threshold $T_{n\_2}$, wherein $T_{n\_2} = F_{v2\_n\_MIN} + (F_{v2\_n\_MAX} - F_{v2\_n\_MIN}) \times w_2$, here, $w_2$ is a weight factor.

The $w_1$ and $w_2$ varies with different microscopic images; while choosing $w_1$, the value of $F_{v1\_n\_MAX} - F_{v1\_n\_MIN}$ should be regarded as an important reference; while choosing $w_2$, the value of $F_{v2\_n\_MAX} - F_{v2\_n\_MIN}$ should be regarded as an important reference; and in this practical operation process, $w_1 = w_2 = 0.5$.

(5) Set n=128, n=64, n=32, n=16 and n=8, respectively repeat steps (3) to (4) for obtaining a definition tagged image $\{I_{D1\_128}(x,y)\}$ corresponding to the $\{I_{S1}(x,y)\}$ and a definition tagged image $\{I_{D2\_128}(x,y)\}$ corresponding to the $\{I_{S2}(x,y)\}$ while n=128; a definition tagged image $\{I_{D1\_64}(x,y)\}$ corresponding to the $\{I_{S1}(x,y)\}$ and a definition tagged image $\{I_{D2\_64}(x,y)\}$ corresponding to the $\{I_{S2}(x,y)\}$ while n=64; a definition tagged image $\{I_{D1\_32}(x,y)\}$ corresponding to the $\{I_{S1}(x,y)\}$ and a definition tagged image $\{I_{D2\_32}(x,y)\}$ corresponding to the $\{I_{S2}(x,y)\}$ while n=32; a definition tagged image $\{I_{D1\_16}(x,y)\}$ corresponding to the $\{I_{S1}(x,y)\}$ and a definition tagged image $\{I_{D2\_16}(x,y)\}$ corresponding to the $\{I_{S2}(x,y)\}$ while n=16; a definition tagged image $\{I_{D1\_8}(x,y)\}$ corresponding to the $\{I_{S1}(x,y)\}$ and a definition tagged image $\{I_{D2\_8}(x,y)\}$ corresponding to the $\{I_{S2}(x,y)\}$ while n=8.

(6) Based on the pixel points with the mark of 1 in the obtained $\{I_{D1\_128}(x,y)\}$, $\{I_{D1\_64}(x,y)\}$, $\{I_{D1\_32}(x,y)\}$, $\{I_{D1\_16}(x,y)\}$ and $\{I_{D1\_8}(x,y)\}$ under a group of blocks with various sizes, make a fuzzy region for obtaining a region growing image corresponding to the $\{I_{S1}(x,y)\}$ and record the region growing image as $\{I_{G1}(x,y)\}$, wherein $I_{G1}(x,y)$ denotes a mark of a pixel point with a coordinate position of (x,y) in the $\{I_{G1}(x,y)\}$.

In the specific embodiment, the acquisition process of the region growing image $\{I_{G1}(x,y)\}$ corresponding to the $\{I_{S1}(x,y)\}$ comprises steps of: (6-a1) while n=128, regarding the definition tagged image $\{I_{D1\_128}(x,y)\}$ corresponding to the $\{I_{S1}(x,y)\}$ as a starting seed image; (6-a2) studying 8 image blocks (2 image blocks respectively at up, down, left and right) each of which having a size of $$\frac{n}{2} \times \frac{n}{2}$$

adjacent to every fuzzy seed block with the size of n×n in the $\{I_{S1}(x,y)\}$, wherein if the mark $$I_{D1\_\frac{n}{2}}(x, y)$$

corresponding to every pixel point in the image block with the size of $$\frac{n}{2} \times \frac{n}{2}$$

adjacent to every fuzzy seed block with the size of n×n in $\{I_{S1}(x,y)\}$ is 1, then make a region growing, namely, a mark of every pixel point in the image block with the size of $$\frac{n}{2} \times \frac{n}{2}$$

at the same position in the starting seed image is set to 1; (6-a3) setting $$n = \frac{n}{2},$$

and returning to step (6-a2) till n=8, here, "=" is an assignment symbol in $$n = \frac{n}{2};$$

and (6-a4) while n=8, directly setting a mark of every pixel point in image blocks in the starting seed image to 1, wherein the image blocks in the starting seed image has the same position with 8 image blocks, each of which having a size of 4×4, adjacent to every fuzzy seed block with a size of 8×8 in the $\{I_{S1}(x,y)\}$; and then setting n=4, and directly setting a mark of every pixel point in image blocks in the starting seed image to 1, wherein the image blocks in the starting seed image has the same position with 8 image blocks, each of which having a size of 2×2, adjacent to every fuzzy seed block with a size of 4×4 in the $\{I_{S1}(x,y)\}$; and then setting n=2, and directly setting the mark of 8 pixel points in the starting seed image to 1, wherein the 8 pixel points in the starting seed image has the same position with the 8 pixel points adjacent to every fuzzy seed block with a size of 2×2 in the $\{I_{S1}(x,y)\}$, thereby obtaining the region growing image $\{I_{G1}(x,y)\}$ corresponding to the $\{I_{S1}(x,y)\}$, wherein the pixel point in $\{I_{S1}(x,y)\}$ whose corresponding mark in $\{I_{G1}(x,y)\}$ is 1 is a fuzzy pixel point, and the pixel point in $\{I_{S1}(x,y)\}$ whose corresponding mark in $\{I_{G1}(x,y)\}$ is 0 is a non-fuzzy pixel point.

Figure 2:
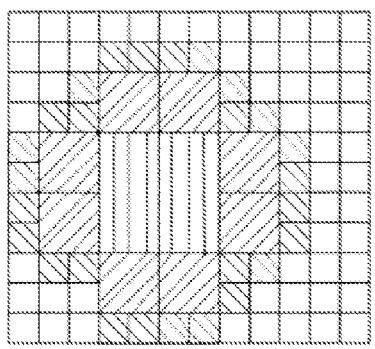
FIG. 2 shows the process of the region growing.

FIG. 2 shows the process of the region growing. The biggest block with vertical stripe in the middle denote the fuzzy seed block which is regarded as a fuzzy seed block by the definition evaluation after $\{I_{S1}(x,y)\}$ is divided into first image blocks each of which having the size of 128×128. The blurring region grows from the fuzzy seed block. The image blocks shown by 45° diagonal stripe in FIG. 2 are with the size of 64×64. For each of these 64×64 image blocks, if its corresponding mark in $\{I_{D1\_64}(x,y)\}$ is 1, the 64×64 image block is remarked as fuzzy seed blocks at next growing. Similarly, the image blocks shown by 135° diagonal stripe in FIG. 2 are with the size of 32×32. For each of these 32×32 image blocks, if its corresponding mark in $\{I_{D1\_32}(x,y)\}$ is 1, the 32×32 image block is remarked as fuzzy seed blocks. But if the corresponding mark in $\{I_{D1\_32}(x,y)\}$ is 0, for example the 32×32 image block at the tenth row and the third column without stripe in FIG. 2, the 32×32 image block will not be remarked as fuzzy seed block, thus the region growth will be stopped at this direction. The fuzzy region grows till the image block is split into 1×1 or the corresponding marks in $\{I_{D1\_n}(x,y)\}$ of all boundary blocks are 0. In this embodiment, the microscopic image in FIG. 3a is divided into image blocks each of which having the size of 128×128 and then the definition of the image blocks is judged. The judged microscopic image is shown in FIG. 4a, wherein the white part at the left is the eliminated fuzzy region which is marked by $\{I_{D1\_128}(x,y)\}$. FIGS. 4b to 4h are microscopic images after the region growing of the blocks with various sizes in turn.

Based on the pixel points with the mark of 1 in the obtained $\{I_{D2\_128}(x,y)\}$, $\{I_{D2\_64}(x,y)\}$, $\{I_{D2\_32}(x,y)\}$, $\{I_{D2\_16}(x,y)\}$ and $\{I_{D2\_8}(x,y)\}$ under a group of blocks with various sizes, make a fuzzy region growing for obtaining a region growing image corresponding to the $\{I_{S2}(x,y)\}$ and record the region growing image as $\{I_{G2}(x,y)\}$, wherein $I_{G2}(x,y)$ denotes a mark of a pixel point with a coordinate position of (x,y) in the $\{I_{G2}(x,y)\}$.

In the specific embodiment, the acquisition process of the region growing image $\{I_{G2}(x,y)\}$ corresponding to the $\{I_{S2}(x,y)\}$ comprises steps of: (6-b1) while n=128, regarding the definition tagged image $\{I_{D2\_128}(x,y)\}$ corresponding to the $\{I_{S2}(x,y)\}$ as a starting seed image; (6-b2) studying 8 image blocks each of which having a size of $$\frac{n}{2} \times \frac{n}{2}$$

adjacent to every fuzzy seed block with the size of n×n in the $\{I_{S2}(x,y)\}$, wherein if the mark of $$I_{D2\_\frac{n}{2}}(x, y)$$

corresponding to every pixel point in the image block with the size of $$\frac{n}{2} \times \frac{n}{2}$$

adjacent to every fuzzy seed block with the size of n×n in $\{I_{S2}(x,y)\}$ is 1, then a mark of every pixel point in the image block with the size of $$\frac{n}{2} \times \frac{n}{2}$$

at the same position in the starting seed image is set to 1; (6-b3) setting $$n = \frac{n}{2},$$

and returning to step (6-b2) till n=8, here, "=" is an assignment symbol in $$n = \frac{n}{2};$$

and (6-b4) while n=8, directly setting a mark of every pixel point in image blocks in the starting seed image to 1, wherein the image blocks in the starting seed image has the same position with 8 image blocks, each of which having a size of 4×4, adjacent to every fuzzy seed block with a size of 8×8 in the $\{I_{S2}(x,y)\}$; and then setting n=4, and directly setting a mark of every pixel point in image blocks in the starting seed image to 1, wherein the image blocks in the starting seed image has the same position with 8 image blocks, each of which having a size of 2×2, adjacent to every fuzzy seed block with a size of 4×4 in the $\{I_{S2}(x,y)\}$; and then setting n=2, and directly setting the mark of 8 pixel points in the starting seed image to 1, wherein the 8 pixel points in the starting seed image has the same position with the 8 pixel points adjacent to every fuzzy seed block with a size of 2×2 in the $\{I_{S2}(x,y)\}$, thereby obtaining the region growing image $\{I_{G2}(x,y)\}$ corresponding to the $\{I_{S2}(x,y)\}$, wherein the pixel point in $\{I_{S2}(x,y)\}$ whose corresponding mark in $\{I_{G2}(x,y)\}$ is 1 is a fuzzy pixel point, and the pixel point in $\{I_{S2}(x,y)\}$ whose corresponding mark in $\{I_{G2}(x,y)\}$ is 0 is a non-fuzzy pixel point.

(7) According to the region growing image $\{I_{G1}(x,y)\}$ corresponding to the $\{I_{S1}(x,y)\}$ and the region growing image $\{I_{G2}(x,y)\}$ corresponding to the $\{I_{S2}(x,y)\}$, fuse the $\{I_{S1}(x,y)\}$ and the $\{I_{S2}(x,y)\}$ for obtaining a final fusion microscopic image and record the final fusion microscopic image as $\{I_F(x,y)\}$, wherein $$I_F(x, y) = \begin{cases} I_{S1}(x, y), & \text{if } I_{G1}(x, y) = 0 \text{ and } I_{G2}(x, y) = 1 \\ I_{S2}(x, y), & \text{if } I_{G1}(x, y) = 1 \text{ and } I_{G2}(x, y) = 0 \\ C & \text{if } I_{G1}(x, y) = I_{G2}(x, y), \end{cases}$$

here, $I_F(x,y)$ denotes a pixel value of a pixel point with a coordinate position of (x,y) in the $\{I_F(x,y)\}$, wherein $$C = \begin{cases} I_{S1}(x, y), & \text{if } C_{nt1}(x, y) < C_{nt2}(x, y) \\ I_{S2}(x, y), & \text{if } C_{nt1}(x, y) > C_{nt2}(x, y) \\ \dfrac{I_{S1}(x, y) + I_{S2}(x, y)}{2}, & \text{if } C_{nt1}(x, y) = C_{nt2}(x, y), \end{cases}$$

$C_{nt1}(x,y)$ denotes an amount of pixel points with a mark of 1 in an 8 neighbor of the pixel point with a coordinate position of (x,y) in the $\{I_{G1}(x,y)\}$ (namely, an amount of fuzzy pixel points), and $C_{nt2}(x,y)$ denotes an amount of pixel points with a mark of 1 in an 8 neighbor of the pixel point with a coordinate position of (x,y) in the $\{I_{G2}(x,y)\}$ (namely, an amount of fuzzy pixel points).

Figure 5:
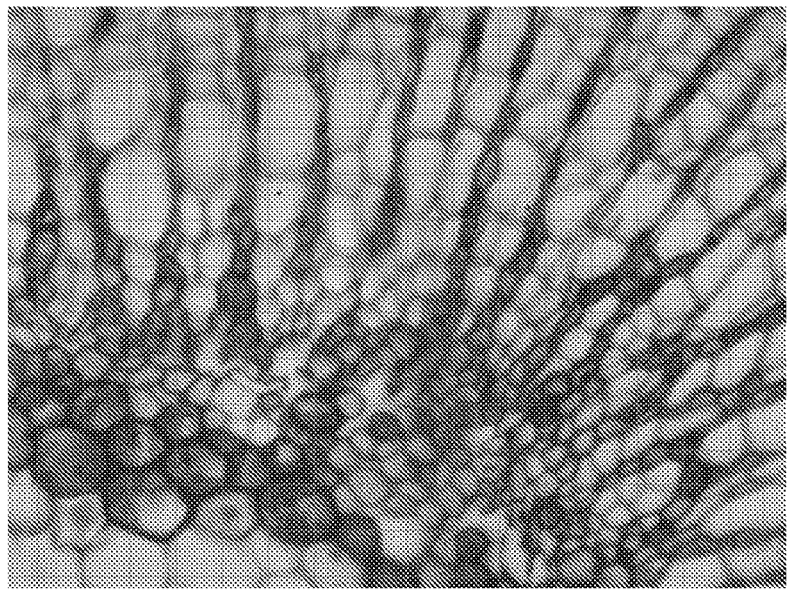
FIG. 5 is a final fusion microscopic image of the cross section of the dicotyledonous stem.
Figure 6:
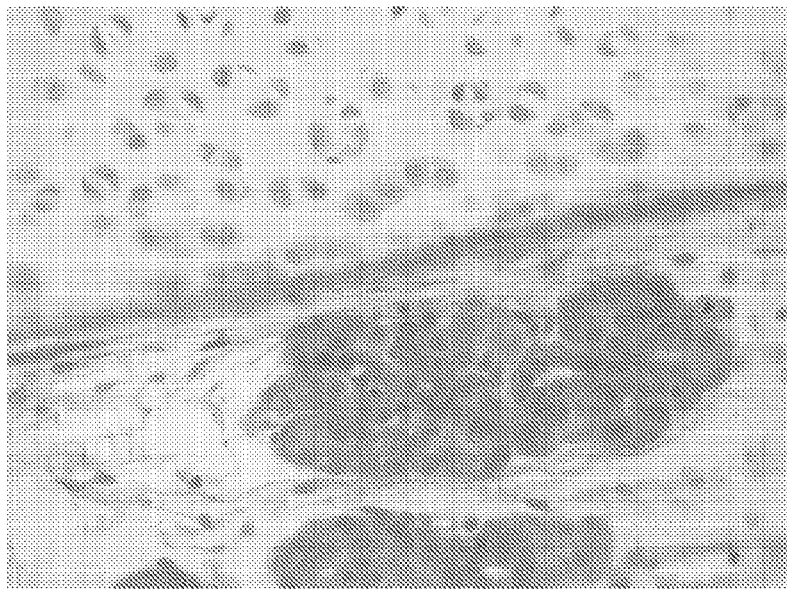
FIG. 6 is a final fusion microscopic image of the epithelial tissue.

FIG. 5 is the final fusion microscopic image corresponding to FIGS. 3a and 3b. FIG. 6 is the final fusion microscopic image corresponding to FIGS. 3c and 3d. Seen from FIGS. 5 and 6, under various microscopic images, the fusion microscopic image obtained by the present invention has richer detail information compared with each of the original images shown in FIG. 3, thereby verifying the feasibility of the present invention.

In the specific embodiment, four object evaluation criteria are selected to measure objective quality of the final fusion images obtained with the present invention. The first object evaluation criterion is TenenGrad function which reflects the texture detail information of the microscopic image. The second object evaluation criterion is Variance function which reflects the integrity of the whole information of the microscopic image. The other two object evaluation criterions are DCT function and Hadamard function which reflect the amount of information in the frequency domain of the microscopic image. The larger the values of four selected object evaluation criteria are, the better the quality of the fused microscopic image is, and the clearer the texture is. Table 1 shows the comparison results of the objective quality of the original microscopic image and the fusion microscopic image obtained by the present invention. Seen from Table 1, every performance index of the fusion microscopic image obtained by the present invention is better and is consistent with the subjective perception.

TABLE 1 the comparison of the object evaluation indexes of the original microscopic image and the fusion microscopic image obtained by the present invention

| | First Group | | | Second Group | | |
|---|---|---|---|---|---|---|
| | Definition of the 1st original image | Definition of the 2nd original image | Definition of the fused image | Definition of the 1st original image | Definition of the 2nd original image | Definition of the fused image |
| TenenGrad | 9.5837 | 7.2121 | 13.5728 | 3.7874 | 5.8198 | 7.3080 |
| Variance | 1.0379 | 0.9972 | 1.2308 | 6.1984 | 6.6823 | 7.1260 |
| DCT | 3.8604 | 3.3031 | 4.6264 | 2.0471 | 1.7681 | 2.4788 |
| Hadamard | 8.4318 | 7.1302 | 9.7902 | 3.6442 | 3.3301 | 4.5130 |

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A microscopic image fusion method based on region growing, comprising steps of:

(1) setting $\{I_{S1}(x,y)\}$ to one microscopic image collected under an optical microscope, and setting $\{I_{S2}(x,y)\}$ to another microscopic image collected under the optical microscope, wherein $0 \leq x \leq W-1$, $0 \leq y \leq H-1$, W denotes a width of an image, H denotes a height of the image, $I_{S1}(x,y)$ denotes a pixel value of a pixel point whose coordinate position is (x,y) in the $\{I_{S1}(x,y)\}$, and $I_{S2}(x,y)$ denotes a pixel value of a pixel point whose coordinate position is (x,y) in the $\{I_{S2}(x,y)\}$;

(2) dividing the $\{I_{S1}(x,y)\}$ into $$\frac{W \times H}{n \times n}$$

non-overlapping first image blocks, each of which having a size of n×n, recording a first image block with a coordinate position of (i,j) in the $\{I_{S1}(x,y)\}$ as $I_{B1\_n}(i,j)$, dividing the $\{I_{S2}(x,y)\}$ into $$\frac{W \times H}{n \times n}$$

non-overlapping second image blocks, each of which having a size of n×n, and recording a second image block with a coordinate position of (i,j) in the $\{I_{S2}(x,y)\}$ as $I_{B2\_n}(i,j)$, wherein $$0 \le i \le \frac{W}{n} - 1, 0 \le j \le \frac{H}{n} - 1,$$

and n is 2-power;

(3) evaluating a definition of every first image block in the $\{I_{S1}(x,y)\}$ for obtaining a definition characteristic value corresponding to every first image block in the $\{I_{S1}(x,y)\}$, and recording a corresponding definition characteristic value thereof as $F_{v1\_n}(i,j)$ for the first image block $I_{B1\_n}(i,j)$ with the coordinate position of (i,j) in the $\{I_{S1}(x,y)\}$;

evaluating a definition of every second image block in the $\{I_{S2}(x,y)\}$ for obtaining a definition characteristic value corresponding to every second image block in the $\{I_{S2}(x,y)\}$, and recording a corresponding definition characteristic value thereof as $F_{v2\_n}(i,j)$ for the second image block $I_{B2\_n}(i,j)$ with the coordinate position of (i,j) in the $\{I_{S2}(x,y)\}$;

(4) determining a first decision threshold of the definition characteristic value corresponding to every first image block in the $\{I_{S1}(x,y)\}$, recording the first decision threshold as $T_{n\_1}$; and then judging whether every first image block in the $\{I_{S1}(x,y)\}$ is a fuzzy seed block according to the definition characteristic value corresponding to every first image block in the $\{I_{S1}(x,y)\}$ and the first decision threshold $T_{n\_1}$, wherein for the first image block $I_{B1\_n}(i,j)$ with the coordinate position of (i,j) in the $\{I_{S1}(x,y)\}$, judge whether the definition characteristic value $F_{v1\_n}(i,j)$ corresponding to the $I_{B1\_n}(i,j)$ is smaller than the first decision threshold $T_{n\_1}$, if it's OK, then judge the $I_{B1\_n}(i,j)$ as the fuzzy seed block and set a mark $M_{B1\_n}(i,j)$ of every pixel point in the $I_{B1\_n}(i,j)$ to 1, if not, judge the $I_{B1\_n}(i,j)$ as the non-fuzzy seed block and set the mark $M_{B1\_n}(i,j)$ of every pixel point in the $I_{B1\_n}(i,j)$ to 0; and then according to the mark $M_{B1\_n}(i,j)$ of every pixel point in every first image block in the $\{I_{S1}(x,y)\}$, calculating a definition tagged image corresponding to the $\{I_{S1}(x,y)\}$ and recording the definition tagged image as $\{I_{D1\_n}(x,y)\}$, wherein $I_{D1\_n}(x,y)=M_{B1\_n}(int(x/n),int(y/n))$, $I_{D1\_n}(x,y)$ denotes a mark of a pixel point with a coordinate position of (x,y) in the $\{I_{D1\_n}(x,y)\}$, and int( ) is a rounding operator;

determining a second decision threshold of the definition characteristic value corresponding to every second image block in the $\{I_{S2}(x,y)\}$, recording the second decision threshold as $T_{n\_2}$; and then judging whether every second image block in the $\{I_{S2}(x,y)\}$ is a fuzzy seed block according to the definition characteristic value corresponding to every second image block in the $\{I_{S2}(x,y)\}$ and the second decision threshold $T_{n\_2}$, wherein for the second image block $I_{B2\_n}(i,j)$ with the coordinate position of (i,j) in the $\{I_{S2}(x,y)\}$, judge whether the definition characteristic value $F_{v2\_n}(i,j)$ corresponding to the $I_{B2\_n}(i,j)$ is smaller than the second decision threshold $T_{n\_2}$, if it's OK, judge the $I_{B2\_n}(i,j)$ as the fuzzy seed block and set a mark $M_{B2\_n}(i,j)$ of every pixel point in the $I_{B2\_n}(i,j)$ to 1, if not, judge the $I_{B2\_n}(i,j)$ as the non-fuzzy seed block and set the mark $M_{B2\_n}(i,j)$ of every pixel point in the $I_{B2\_n}(i,j)$ to 0; and then according to the mark $M_{B2\_n}(i,j)$ of every pixel point in every second image block in the $\{I_{S2}(x,y)\}$, calculating a definition tagged image corresponding to the $\{I_{S2}(x,y)\}$ and recording the definition tagged image as $\{I_{D2\_n}(x,y)\}$, wherein $I_{D2\_n}(x,y)=M_{B2\_n}(int(x/n),int(y/n))$, $I_{D2\_n}(x,y)$ denotes a mark of a pixel point with a coordinate position of (x,y) in the $\{I_{D2\_n}(x,y)\}$, and int( ) is a rounding operator;

(5) setting n=128, n=64, n=32, n=16 and n=8, respectively repeating steps (3) to (4) for obtaining a definition tagged image $\{I_{D1\_128}(x,y)\}$ corresponding to the $\{I_{S1}(x,y)\}$ and a definition tagged image $\{I_{D2\_128}(x,y)\}$ corresponding to the $\{I_{S2}(x,y)\}$ while n=128; a definition tagged image $\{I_{D1\_64}(x,y)\}$ corresponding to the $\{I_{S1}(x,y)\}$ and a definition tagged image $\{I_{D2\_64}(x,y)\}$ corresponding to the $\{I_{S2}(x,y)\}$ while n=64; a definition tagged image $\{I_{D1\_32}(x,y)\}$ corresponding to the $\{I_{S1}(x,y)\}$ and a definition tagged image $\{I_{D2\_32}(x,y)\}$ corresponding to the $\{I_{S2}(x,y)\}$ while n=32; a definition tagged image $\{I_{D1\_16}(x,y)\}$ corresponding to the $\{I_{S1}(x,y)\}$ and a definition tagged image $\{I_{D2\_16}(x,y)\}$ corresponding to the $\{I_{S2}(x,y)\}$ while n=16; a definition tagged image $\{I_{D1\_8}(x,y)\}$ corresponding to the $\{I_{S1}(x,y)\}$ and a definition tagged image $\{I_{D2\_8}(x,y)\}$ corresponding to the $\{I_{S2}(x,y)\}$ while n=8;

(6) based on the pixel points with the mark of 1 in the $\{I_{D1\_128}(x,y)\}$, $\{I_{D1\_64}(x,y)\}$, $\{I_{D1\_32}(x,y)\}$, $\{I_{D1\_16}(x,y)\}$ and $\{I_{D1\_8}(x,y)\}$, making a fuzzy region growing for obtaining a region growing image corresponding to the $\{I_{S1}(x,y)\}$ and recording the region growing image as $\{I_{G1}(x,y)\}$, wherein $I_{G1}(x,y)$ denotes a mark of a pixel point with a coordinate position of (x,y) in the $\{I_{G1}(x,y)\}$;

based on the pixel points with the mark of 1 in the $\{I_{D2\_128}(x,y)\}$, $\{I_{D2\_64}(x,y)\}$, $\{I_{D2\_32}(x,y)\}$, $\{I_{D2\_16}(x,y)\}$ and $\{I_{D2\_8}(x,y)\}$, making a fuzzy region growing for obtaining a region growing image corresponding to the $\{I_{S2}(x,y)\}$ and recording the region growing image as $I_{G2}(x,y)$, wherein $I_{G2}(x,y)$ denotes a mark of a pixel point with a coordinate position of (x,y) in the $\{I_{G2}(x,y)\}$; and (7) according to the region growing image $\{I_{G1}(x,y)\}$ corresponding to the $\{I_{S1}(x,y)\}$ and the region growing image $\{I_{G2}(x,y)\}$ corresponding to the $\{I_{S2}(x,y)\}$, fusing the $\{I_{S1}(x,y)\}$ and the $\{I_{S2}(x,y)\}$ for obtaining a final fusion microscopic image and recording the final fusion microscopic image as $\{I_F(x,y)\}$, wherein $$I_F(x,y) = \begin{cases} I_{S1}(x,y), & \text{if } I_{G1}(x,y) = 0 \text{ and } I_{G2}(x,y) = 1 \\ I_{S2}(x,y), & \text{if } I_{G1}(x,y) = 1 \text{ and } I_{G2}(x,y) = 0 \\ C & \text{if } I_{G1}(x,y) = I_{G2}(x,y), \end{cases}$$

here, $I_F(x,y)$ denotes a pixel value of a pixel point with a coordinate position of (x,y) in the $\{I_F(x,y)\}$, $$C = \begin{cases} I_{S1}(x, y), & \text{if } C_{nt1}(x, y) < C_{nt2}(x, y) \\ I_{S2}(x, y), & \text{if } C_{nt1}(x, y) > C_{nt2}(x, y) \\ \dfrac{I_{S1}(x, y) + I_{S2}(x, y)}{2}, & \text{if } C_{nt1}(x, y) = C_{nt2}(x, y), \end{cases}$$

$C_{nt1}(x,y)$ denotes an amount of pixel points with a mark of 1 in an 8 neighbor of a pixel point with a coordinate position of (x,y) in the $\{I_{G1}(x,y)\}$, and $C_{nt2}(x,y)$ denotes an amount of pixel points with a mark of 1 in an 8 neighbor of a pixel point with a coordinate position of (x,y) in the $\{I_{G2}(x,y)\}$.

2. The microscopic image fusion method based on region growing, as recited in claim 1, wherein in step (3), a concrete process of calculating the definition characteristic value $F_{v1\_n}(i,j)$ corresponding to the first image block $I_{B1\_n}(i,j)$ with the coordinate position of (i,j) in the $\{I_{S1}(x,y)\}$ comprises steps of: (3-a1) using the improved TenenGrad gradient function to calculate a horizontal gradient and a vertical gradient of every pixel point in the $I_{B1\_n}(i,j)$, wherein for a pixel point with a coordinate position of $(x_1,y_1)$ in the $I_{B1\_n}(i,j)$, respectively record the horizontal gradient and the vertical gradient thereof as $G_{h1}(x_1,y_1)$ and $G_{v1}(x_1,y_1)$, wherein $G_{h1}(x_1,y_1)=(f_1(x_1-1,y_1-1)+2f_1(x_1,y_1-1)+f_1(x_1+1,y_1-1))-(f_1(x_1-1,y_1+1)+2f_1(x_1,y_1+1)+f_1(x_1+1,y_1+1))$, $G_{v1}(x_1,y_1)=(f_1(x_1+1,y_1-1)+2f_1(x_1+1,y_1)+f_1(x_1+1,y_1+1))-(f_1(x_1-1,y_1-1)+2f_1(x_1-1,y_1)+f_1(x_1-1,y_1+1))$, here, $0 \leq x_1 \leq n-1$, $0 \leq y_1 \leq n-1$, $f_1(x_1-1,y_1-1)$ denotes a pixel value of a pixel point with a coordinate position of $(x_1-1,y_1-1)$ in the $I_{B1\_n}(i,j)$, $f_1(x_1,y_1-1)$ denotes a pixel value of a pixel point with a coordinate position of $(x_1,y_1-1)$ in the $I_{B1\_n}(i,j)$, $f_1(x_1+1,y_1-1)$ denotes a pixel value of a pixel point with a coordinate position of $(x_1+1,y_1-1)$ in the $I_{B1\_n}(i,j)$, $f_1(x_1-1,y_1+1)$ denotes a pixel value of a pixel point with a coordinate position of $(x_1-1,y_1+1)$ in the $I_{B1\_n}(i,j)$, $f_1(x_1,y_1+1)$ denotes a pixel value of a pixel point with a coordinate position of $(x_1,y_1+1)$ in the $I_{B1\_n}(i,j)$, $f_1(x_1+1,y_1+1)$ denotes a pixel value of a pixel point with a coordinate position of $(x_1+1,y_1+1)$ in the $I_{B1\_n}(i,j)$, $f_1(x_1+1,y_1)$ denotes a pixel value of a pixel point with a coordinate position of $(x_1+1,y_1)$ in the $I_{B1\_n}(i,j)$, and $f_1(x_1-1,y_1)$ denotes a pixel value of a pixel point with a coordinate position of $(x_1-1,y_1)$ in the $I_{B1\_n}(i,j)$; and (3-a2) according to the horizontal gradient and the vertical gradient of every pixel point in the $I_{B1\_n}(i,j)$, calculating the definition characteristic value $F_{v1\_n}(i,j)$ corresponding to the $I_{B1\_n}(i,j)$, wherein, $$F_{v1\_n}(i,j) = \sum_{x_1=0}^{n-1} \sum_{y_1=0}^{n-1} (G_{v1}^2(x_1,y_1) + G_{h1}^2(x_1,y_1));$$

wherein in step (3), a concrete process of calculating the definition characteristic value $F_{v2\_n}(i,j)$ corresponding to the second image block $I_{B2\_n}(i,j)$ with the coordinate position of (i,j) in the $\{I_{S2}(x,y)\}$ comprises steps of: (3-b1) using the improved TenenGrad gradient function to calculate a horizontal gradient and a vertical gradient of every pixel point in the $I_{B2\_n}(i,j)$, wherein for a pixel point with a coordinate position of $(x_1,y_1)$ in the $I_{B2\_n}(i,j)$, respectively record the horizontal gradient and the vertical gradient thereof as $G_{h2}(x_1,y_1)$ and $G_{v2}(x_1,y_1)$, wherein $G_{h2}(x_1,y_1)=(f_2(x_1-1,y_1-1)+2f_2(x_1,y_1-1)+f_2(x_1+1,y_1-1))-(f_2(x_1-1,y_1+1)+2f_2(x_1,y_1+1)+f_2(x_1+1,y_1+1))$, $G_{v2}(x_1,y_1)=(f_2(x_1+1,y_1-1)+2f_2(x_1+1,y_1)+f_2(x_1+1,y_1+1))-(f_2(x_1-1,y_1-1)+2f_2(x_1-1,y_1)+f_2(x_1-1,y_1+1))$ here, $0 \leq x_1 \leq n-1$, $0 \leq y_1 \leq n-1$, $f_2(x_1-1,y_1-1)$ denotes a pixel value of a pixel point with a coordinate position of $(x_1-1,y_1-1)$ in the $I_{B2\_n}(i,j)$, $f_2(x_1,y_1-1)$ denotes a pixel value of a pixel point with a coordinate position of $(x_1,y_1-1)$ in the $I_{B2\_n}(i,j)$, $f_2(x_1+1,y_1-1)$ denotes a pixel value of a pixel point with a coordinate position of $(x_1+1,y_1-1)$ in the $I_{B2\_n}(i,j)$, $f_2(x_1-1,y_1+1)$ denotes a pixel value of a pixel point with a coordinate position of $(x_1-1,y_1+1)$ in the $I_{B2\_n}(i,j)$, $f_2(x_1,y_1+1)$ denotes a pixel value of a pixel point with a coordinate position of $(x_1,y_1+1)$ in the $I_{B2\_n}(i,j)$, $f_2(x_1+1,y_1+1)$ denotes a pixel value of a pixel point with a coordinate position of $(x_1+1,y_1+1)$ in the $I_{B2\_n}(i,j)$, $f_2(x_1+1,y_1)$ denotes a pixel value of a pixel point with a coordinate position of $(x_1+1,y_1)$ in the $I_{B2\_n}(i,j)$, and $f_2(x_1-1,y_1)$ denotes a pixel value of a pixel point with a coordinate position of $(x_1-1,y_1)$ in the $I_{B2\_n}(i,j)$; and (3-b2) according to the horizontal gradient and the vertical gradient of every pixel point in the $I_{B2\_n}(i,j)$, calculating the definition characteristic value $F_{v2\_n}(i,j)$ corresponding to the $I_{B2\_n}(i,j)$ wherein, $$F_{v2\_n}(i,j) = \sum_{x_1=0}^{n-1} \sum_{y_1=0}^{n-1} (G_{v2}^2(x_1,y_1) + G_{h2}^2(x_1,y_1)).$$

3. The microscopic image fusion method based on region growing, as recited in claim 1, wherein in step (4), a concrete process of determining the first decision threshold $T_{n\_1}$ of the definition characteristic value corresponding to every first image block in the $\{I_{S1}(x,y)\}$ comprises steps of: (4-a1) sequencing the definition characteristic value corresponding to every first image block in the $\{I_{S1}(x,y)\}$, finding out a maximum definition characteristic value and a minimum characteristic value, and respectively recording the maximum definition characteristic value and the minimum characteristic value as $F_{v1\_n\_MAX}$ and $F_{v1\_n\_MIN}$; and (4-a2) calculating the first decision threshold $T_{n\_1}$, wherein $T_{n\_1}=F_{v1\_n\_MIN}+(F_{v1\_n\_MAX}-F_{v1\_n\_MIN})\times w_1$, here, $w_1$ is a weight factor;

wherein in step (4), the concrete process of determining the second decision threshold $T_{n\_2}$ of the definition characteristic value corresponding to every second image block in the $\{I_{S2}(x,y)\}$ comprises steps of: (4-b1) sequencing the definition characteristic value corresponding to every second image block in the $\{I_{S2}(x,y)\}$, finding out a maximum definition characteristic value and a minimum characteristic value, and respectively recording the maximum definition characteristic value and the minimum characteristic value as $F_{v2\_n\_MAX}$ and $F_{v2\_n\_MIN}$; and (4-b2) calculating the second decision threshold $T_{n\_2}$, wherein $T_{n\_2}=F_{v2\_n\_MIN}+(F_{v2\_n\_MAX}-F_{v2\_n\_MIN})\times w_2$, here, $w_2$ is a weight factor.

4. The microscopic image fusion method based on region growing, as recited in claim 2, wherein in step (4), a concrete process of determining the first decision threshold $T_{n\_1}$ of the definition characteristic value corresponding to every first image block in the $\{I_{S1}(x,y)\}$ comprises steps of: (4-a1) sequencing the definition characteristic value corresponding to every first image block in the $\{I_{S1}(x,y)\}$, finding out a maximum definition characteristic value and a minimum characteristic value, and respectively recording the maximum definition characteristic value and the minimum characteristic value as $F_{v1\_n\_MAX}$ and $F_{v1\_n\_MIN}$; and (4-a2) calculating the first decision threshold $T_{n\_1}$, wherein $T_{n\_1}=F_{v1\_n\_MIN}+(F_{v1\_n\_MAX}-F_{v1\_n\_MIN})\times w_1$, here, $w_1$ is a weight factor;

wherein in step (4), the concrete process of determining the second decision threshold $T_{n\_2}$ of the definition characteristic value corresponding to every second image block in the $\{I_{S2}(x,y)\}$ comprises steps of: (4-b1) sequencing the definition characteristic value corresponding to every second image block in the $\{I_{S2}(x,y)\}$, finding out a maximum definition characteristic value and a minimum characteristic value, and respectively recording the maximum definition characteristic value and the minimum characteristic value as $F_{v2\_n\_MAX}$ and $F_{v2\_n\_MIN}$; and (4-b2) calculating the second decision threshold $T_{n\_2}$, wherein $T_{n\_2}=F_{v2\_n\_MIN}+(F_{v2\_n\_MAX}-F_{v2\_n\_MIN})\times w_2$, here, $w_2$ is a weight factor.

5. The microscopic image fusion method based on region growing, as recited in claim 3, wherein in (4-a2) of step (4), $0.4 \leq w_1 \leq 0.6$; and in (4-b2) of step (4), $0.4 \leq w_2 \leq 0.6$.

6. The microscopic image fusion method based on region growing, as recited in claim 4, wherein in (4-a2) of step (4), $0.4 \leq w_1 \leq 0.6$; and in (4-b2) of step (4), $0.4 \leq w_2 \leq 0.6$.

7. The microscopic image fusion method based on region growing, as recited in claim 1, wherein in step (6), the acquisition process of the region growing image $\{I_{G1}(x,y)\}$ corresponding to the $\{I_{S1}(x,y)\}$ comprises steps of: (6-a1) while n=128, regarding the definition tagged image $\{I_{D1\_128}(x,y)\}$ corresponding to the $\{I_{S1}(x,y)\}$ as a starting seed image; (6-a2) studying 8 image blocks each of which having a size of $$\frac{n}{2} \times \frac{n}{2}$$

adjacent to every fuzzy seed block with the size of n×n in the $\{I_{S1}(x,y)\}$, wherein if a mark $$I_{D1\_\frac{n}{2}}(x, y)$$

corresponding to every pixel point in the image block with the size of $$\frac{n}{2} \times \frac{n}{2}$$

adjacent to every fuzzy seed block with the size of n×n in $\{I_{S1}(x,y)\}$ is 1, then a mark of every pixel point in the image block with the size of $$\frac{n}{2} \times \frac{n}{2}$$

at the same position in the starting seed image is set to 1; (6-a3) setting $$n = \frac{n}{2},$$

and returning to step (6-a2) till n=8, here, "=" is an assignment symbol in $$n = \frac{n}{2};$$

and (6-a4) while n=8, directly setting a mark of every pixel point in image blocks in the starting seed image to 1, wherein the image blocks in the starting seed image has a same position with 8 image blocks, each of which having a size of 4×4, adjacent to every fuzzy seed block with a size of 8×8 in the $\{I_{S1}(x,y)\}$; and then setting n=4, and directly setting a mark of every pixel point in image blocks in the starting seed image to 1, wherein the image blocks in the starting seed image has a same position with 8 image blocks, each of which having a size of 2×2, adjacent to every fuzzy seed block with a size of 4×4 in the $\{I_{S1}(x,y)\}$; and then setting n=2, and directly setting a mark of 8 pixel points in the starting seed image to 1, wherein the 8 pixel points in the starting seed image has a same position with the 8 pixel points adjacent to every fuzzy seed block with a size of 2×2 in the $\{I_{S1}(x,y)\}$, thereby obtaining the region growing image $\{I_{G1}(x,y)\}$ corresponding to the $\{I_{S1}(x,y)\}$, wherein the pixel point in $\{I_{S1}(x,y)\}$ whose corresponding mark in $\{I_{G1}(x,y)\}$ is 1 is a fuzzy pixel point, and the pixel point in $\{I_{S1}(x,y)\}$ whose corresponding mark in $\{I_{G1}(x,y)\}$ is 0 is a non-fuzzy pixel point;

wherein in step (6), the acquisition process of the region growing image $\{I_{G2}(x,y)\}$ corresponding to the $\{I_{S2}(x,y)\}$ comprises steps of: (6-b1) while n=128, regarding the definition tagged image $\{I_{D2\_128}(x,y)\}$ corresponding to the $\{I_{S2}(x,y)\}$ as a starting seed image; (6-b2) studying 8 image blocks each of which having a size of $$\frac{n}{2} \times \frac{n}{2}$$

adjacent to every fuzzy seed block with the size of n×n in the $\{I_{S2}(x,y)\}$, wherein if a mark of $$I_{D2\_\frac{n}{2}}(x, y)$$

corresponding to every pixel point in the image block with the size of $$\frac{n}{2} \times \frac{n}{2}$$

adjacent to every fuzzy seed block with the size of n×n in $\{I_{S2}(x,y)\}$ is 1, then a mark of every pixel point in the image block with the size of $$\frac{n}{2} \times \frac{n}{2}$$

at the same position in the starting seed image is set to 1; (6-b3) setting $$n = \frac{n}{2},$$

and returning to step (6-b2) till n=8, here, "=" is an assignment symbol in $$n = \frac{n}{2};$$

and (6-b4) while n=8, directly setting a mark of every pixel point in image blocks in the starting seed image to 1, wherein the image blocks in the starting seed image has a same position with 8 image blocks, each of which having a size of 4×4, adjacent to every fuzzy seed block with a size of 8×8 in the $\{I_{S2}(x,y)\}$; and then setting n=4, and directly setting a mark of every pixel point in image blocks in the starting seed image to 1, wherein the image blocks in the starting seed image has a same position with 8 image blocks, each of which having a size of 2×2, adjacent to every fuzzy seed block with a size of 4×4 in the $\{I_{S2}(x,y)\}$; and then setting n=2, and directly setting a mark of 8 pixel points in the starting seed image to 1, wherein the 8 pixel points in the starting seed image has a same position with the 8 pixel points adjacent to every fuzzy seed block with a size of 2×2 in the $\{I_{S2}(x,y)\}$, thereby obtaining the region growing image $\{I_{G2}(x,y)\}$ corresponding to the $\{I_{S2}(x,y)\}$, wherein the pixel point in $\{I_{S2}(x,y)\}$ whose corresponding mark in $\{I_{G2}(x,y)\}$ is 1 is a fuzzy pixel point, and the pixel point in $\{I_{S2}(x,y)\}$ whose corresponding mark in $\{I_{G2}(x,y)\}$ is 0 is a non-fuzzy pixel point.

8. The microscopic image fusion method based on region growing, as recited in claim 2, wherein in step (6), the acquisition process of the region growing image $\{I_{G1}(x,y)\}$ corresponding to the $\{I_{S1}(x,y)\}$ comprises steps of: (6-a1) while n=128, regarding the definition tagged image $\{I_{D1\_128}(x,y)\}$ corresponding to the $\{I_{S1}(x,y)\}$ as a starting seed image; (6-a2) studying 8 image blocks each of which having a size of $$\frac{n}{2} \times \frac{n}{2}$$

adjacent to every fuzzy seed block with the size of n×n in the $\{I_{S1}(x,y)\}$, wherein if a mark $$I_{D1\_\frac{n}{2}}(x, y)$$

corresponding to every pixel point in the image block with the size of $$\frac{n}{2} \times \frac{n}{2}$$

adjacent to every fuzzy seed block with the size of n×n in $\{I_{S1}(x,y)\}$ is 1, then a mark of every pixel point in the image block with the size of $$\frac{n}{2} \times \frac{n}{2}$$

at the same position in the starting seed image is set to 1; (6-a3) setting $$n = \frac{n}{2},$$

and returning to step (6-a2) till n=8, here, "=" is an assignment symbol in $$n = \frac{n}{2};$$

and (6-a4) while n=8, directly setting a mark of every pixel point in image blocks in the starting seed image to 1, wherein the image blocks in the starting seed image has a same position with 8 image blocks, each of which having a size of 4×4, adjacent to every fuzzy seed block with a size of 8×8 in the $\{I_{S1}(x,y)\}$; and then setting n=4, and directly setting a mark of every pixel point in image blocks in the starting seed image to 1, wherein the image blocks in the starting seed image has a same position with 8 image blocks, each of which having a size of 2×2, adjacent to every fuzzy seed block with a size of 4×4 in the $\{I_{S1}(x,y)\}$; and then setting n=2, and directly setting a mark of 8 pixel points in the starting seed image to 1, wherein the 8 pixel points in the starting seed image has a same position with the 8 pixel points adjacent to every fuzzy seed block with a size of 2×2 in the $\{I_{S1}(x,y)\}$, thereby obtaining the region growing image $\{I_{G1}(x,y)\}$ corresponding to the $\{I_{S1}(x,y)\}$, wherein the pixel point in $\{I_{S1}(x,y)\}$ whose corresponding mark in $\{I_{G1}(x,y)\}$ is 1 is a fuzzy pixel point, and the pixel point in $\{I_{S1}(x,y)\}$ whose corresponding mark in $\{I_{G1}(x,y)\}$ is 0 is a non-fuzzy pixel point;

wherein in step (6), the acquisition process of the region growing image $\{I_{G2}(x,y)\}$ corresponding to the $\{I_{S2}(x,y)\}$ comprises steps of: (6-b1) while n=128, regarding the definition tagged image $\{I_{D2\_128}(x,y)\}$ corresponding to the $\{I_{S2}(x,y)\}$ as a starting seed image; (6-b2) studying 8 image blocks each of which having a size of $$\frac{n}{2} \times \frac{n}{2}$$

adjacent to every fuzzy seed block with the size of n×n in the $\{I_{S2}(x,y)\}$, wherein if a mark of $$I_{D2\_\frac{n}{2}}(x, y)$$

corresponding to every pixel point in the image block with the size of $$\frac{n}{2} \times \frac{n}{2}$$

adjacent to every fuzzy seed block with the size of n×n in $\{I_{S2}(x,y)\}$ is 1, then a mark of every pixel point in the image block with the size of $$\frac{n}{2} \times \frac{n}{2}$$

at the same position in the starting seed image is set to 1; (6-b3) setting $$n = \frac{n}{2},$$

and returning to step (6-b2) till n=8, here, "=" is an assignment symbol in $$n = \frac{n}{2};$$

and (6-b4) while n=8, directly setting a mark of every pixel point in image blocks in the starting seed image to 1, wherein the image blocks in the starting seed image has a same position with 8 image blocks, each of which having a size of 4×4, adjacent to every fuzzy seed block with a size of 8×8 in the $\{I_{S2}(x,y)\}$; and then setting n=4, and directly setting a mark of every pixel point in image blocks in the starting seed image to 1, wherein the image blocks in the starting seed image has a same position with 8 image blocks, each of which having a size of 2×2, adjacent to every fuzzy seed block with a size of 4×4 in the $\{I_{S2}(x,y)\}$; and then setting n=2, and directly setting a mark of 8 pixel points in the starting seed image to 1, wherein the 8 pixel points in the starting seed image has a same position with the 8 pixel points adjacent to every fuzzy seed block with a size of 2×2 in the $\{I_{S2}(x,y)\}$, thereby obtaining the region growing image $\{I_{G2}(x,y)\}$ corresponding to the $\{I_{S2}(x,y)\}$, wherein the pixel point in $\{I_{S2}(x,y)\}$ whose corresponding mark in $\{I_{G2}(x,y)\}$ is 1 is a fuzzy pixel point, and the pixel point in $\{I_{S2}(x,y)\}$ whose corresponding mark in $\{I_{G2}(x,y)\}$ is 0 is a non-fuzzy pixel point.

9. The microscopic image fusion method based on region growing, as recited in claim 3, wherein in step (6), the acquisition process of the region growing image $\{I_{G1}(x,y)\}$ corresponding to the $\{I_{S1}(x,y)\}$ comprises steps of: (6-a1) while n=128, regarding the definition tagged image $\{I_{D1\_128}(x,y)\}$ corresponding to the $\{I_{S1}(x,y)\}$ as a starting seed image; (6-a2) studying 8 image blocks each of which having a size of $$\frac{n}{2} \times \frac{n}{2}$$

adjacent to every fuzzy seed block with the size of n×n in the $\{I_{S1}(x,y)\}$, wherein if a mark $$I_{D2\_\frac{n}{2}}(x, y)$$

corresponding to every pixel point in the image block with the size of $$\frac{n}{2} \times \frac{n}{2}$$

adjacent to every fuzzy seed block with the size of n×n in $\{I_{S1}(x,y)\}$ is 1, then a mark of every pixel point in the image block with the size of $$\frac{n}{2} \times \frac{n}{2}$$

at the same position in the starting seed image is set to 1; (6-a3) setting $$n = \frac{n}{2},$$

and returning to step (6-a2) till n=8, here, "=" is an assignment symbol in $$n = \frac{n}{2};$$

and (6-a4) while n=8, directly setting a mark of every pixel point in image blocks in the starting seed image to 1, wherein the image blocks in the starting seed image has a same position with 8 image blocks, each of which having a size of 4×4, adjacent to every fuzzy seed block with a size of 8×8 in the $\{I_{S1}(x,y)\}$; and then setting n=4, and directly setting a mark of every pixel point in image blocks in the starting seed image to 1, wherein the image blocks in the starting seed image has a same position with 8 image blocks, each of which having a size of 2×2, adjacent to every fuzzy seed block with a size of 4×4 in the $\{I_{S1}(x,y)\}$; and then setting n=2, and directly setting a mark of 8 pixel points in the starting seed image to 1, wherein the 8 pixel points in the starting seed image has a same position with the 8 pixel points adjacent to every fuzzy seed block with a size of 2×2 in the $\{I_{S1}(x,y)\}$, thereby obtaining the region growing image $\{I_{G1}(x,y)\}$ corresponding to the $\{I_{S1}(x,y)\}$, wherein the pixel point in $\{I_{S1}(x,y)\}$ whose corresponding mark in $\{I_{G1}(x,y)\}$ is 1 is a fuzzy pixel point, and the pixel point in $\{I_{S1}(x,y)\}$ whose corresponding mark in $\{I_{G1}(x,y)\}$ is 0 is a non-fuzzy pixel point;

wherein in step (6), the acquisition process of the region growing image $\{I_{G2}(x,y)\}$ corresponding to the $\{I_{S2}(x,y)\}$ comprises steps of: (6-b1) while n=128, regarding the definition tagged image $\{I_{D2\_128}(x,y)\}$ corresponding to the $\{I_{S2}(x,y)\}$ as a starting seed image; (6-b2) studying 8 image blocks each of which having a size of $$\frac{n}{2} \times \frac{n}{2}$$

adjacent to every fuzzy seed block with the size of n×n in the $\{I_{S2}(x,y)\}$, wherein if a mark of $$I_{D2\_\frac{n}{2}}(x, y)$$

corresponding to every pixel point in the image block with the size of $$\frac{n}{2} \times \frac{n}{2}$$

adjacent to every fuzzy seed block with the size of n×n in $\{I_{S2}(x,y)\}$ is 1, then a mark of every pixel point in the image block with the size of $$\frac{n}{2} \times \frac{n}{2}$$

at the same position in the starting seed image is set to 1; (6-b3) setting $$n = \frac{n}{2},$$

and returning to step (6-b2) till n=8, here, "=" is an assignment symbol in $$n = \frac{n}{2};$$

and (6-b4) while n=8, directly setting a mark of every pixel point in image blocks in the starting seed image to 1, wherein the image blocks in the starting seed image has a same position with 8 image blocks, each of which having a size of 4×4, adjacent to every fuzzy seed block with a size of 8×8 in the $\{I_{S2}(x,y)\}$; and then setting n=4, and directly setting a mark of every pixel point in image blocks in the starting seed image to 1, wherein the image blocks in the starting seed image has a same position with 8 image blocks, each of which having a size of 2×2, adjacent to every fuzzy seed block with a size of 4×4 in the $\{I_{S2}(x,y)\}$; and then setting n=2, and directly setting a mark of 8 pixel points in the starting seed image to 1, wherein the 8 pixel points in the starting seed image has a same position with the 8 pixel points adjacent to every fuzzy seed block with a size of 2×2 in the $\{I_{S2}(x,y)\}$, thereby obtaining the region growing image $\{I_{G2}(x,y)\}$ corresponding to the $\{I_{S2}(x,y)\}$, wherein the pixel point in $\{I_{S2}(x,y)\}$ whose corresponding mark in $\{I_{G2}(x,y)\}$ is 1 is a fuzzy pixel point, and the pixel point in $\{I_{S2}(x,y)\}$ whose corresponding mark in $\{I_{G2}(x,y)\}$ is 0 is a non-fuzzy pixel point.

10. The microscopic image fusion method based on region growing, as recited in claim 4, wherein in step (6), the acquisition process of the region growing image $\{I_{G1}(x,y)\}$ corresponding to the $\{I_{S1}(x,y)\}$ comprises steps of: (6-a1) while n=128, regarding the definition tagged image $\{I_{D1\_128}(x,y)\}$ corresponding to the $\{I_{S1}(x,y)\}$ as a starting seed image; (6-a2) studying 8 image blocks each of which having a size of $$\frac{n}{2} \times \frac{n}{2}$$

adjacent to every fuzzy seed block with the size of n×n in the $\{I_{S1}(x,y)\}$, wherein if a mark $$I_{D1\_\frac{n}{2}}(x, y)$$

corresponding to every pixel point in the image block with the size of $$\frac{n}{2} \times \frac{n}{2}$$

adjacent to every fuzzy seed block with the size of n×n in $\{I_{S1}(x,y)\}$ is 1, then a mark of every pixel point in the image block with the size of $$\frac{n}{2} \times \frac{n}{2}$$

at the same position in the starting seed image is set to 1; (6-a3) setting $$n = \frac{n}{2},$$

and returning to step (6-a2) till n=8, here, "=" is an assignment symbol in $$n = \frac{n}{2};$$

and (6-a4) while n=8, directly setting a mark of every pixel point in image blocks in the starting seed image to 1, wherein the image blocks in the starting seed image has a same position with 8 image blocks, each of which having a size of 4×4, adjacent to every fuzzy seed block with a size of 8×8 in the $\{I_{S1}(x,y)\}$; and then setting n=4, and directly setting a mark of every pixel point in image blocks in the starting seed image to 1, wherein the image blocks in the starting seed image has a same position with 8 image blocks, each of which having a size of 2×2, adjacent to every fuzzy seed block with a size of 4×4 in the $\{I_{S1}(x,y)\}$; and then setting n=2, and directly setting a mark of 8 pixel points in the starting seed image to 1, wherein the 8 pixel points in the starting seed image has a same position with the 8 pixel points adjacent to every fuzzy seed block with a size of 2×2 in the $\{I_{S1}(x,y)\}$, thereby obtaining the region growing image $\{I_{G1}(x,y)\}$ corresponding to the $\{I_{S1}(x,y)\}$, wherein the pixel point in $\{I_{S1}(x,y)\}$ whose corresponding mark in $\{I_{G1}(x,y)\}$ is 1 is a fuzzy pixel point, and the pixel point in $\{I_{S1}(x,y)\}$ whose corresponding mark in $\{I_{G1}(x,y)\}$ is 0 is a non-fuzzy pixel point;

wherein in step (6), the acquisition process of the region growing image $\{I_{G2}(x,y)\}$ corresponding to the $\{I_{S2}(x,y)\}$ comprises steps of: (6-b1) while n=128, regarding the definition tagged image $\{I_{D2\_128}(x,y)\}$ corresponding to the $\{I_{S2}(x,y)\}$ as a starting seed image; (6-b2) studying 8 image blocks each of which having a size of $$\frac{n}{2} \times \frac{n}{2}$$

adjacent to every fuzzy seed block with the size of n×n in the $\{I_{S2}(x,y)\}$, wherein if a mark of $$I_{D2\_\frac{n}{2}}(x, y)$$

corresponding to every pixel point in the image block with the size of $$\frac{n}{2} \times \frac{n}{2}$$

adjacent to every fuzzy seed block with the size of n×n in $\{I_{S2}(x,y)\}$ is 1, then a mark of every pixel point in the image block with the size of $$\frac{n}{2} \times \frac{n}{2}$$

at the same position in the starting seed image is set to 1; (6-b3) setting $$n = \frac{n}{2},$$

and returning to step (6-b2) till n=8, here, "=" is an assignment symbol in $$n = \frac{n}{2};$$

and (6-b4) while n=8, directly setting a mark of every pixel point in image blocks in the starting seed image to 1, wherein the image blocks in the starting seed image has a same position with 8 image blocks, each of which having a size of 4×4, adjacent to every fuzzy seed block with a size of 8×8 in the $\{I_{S2}(x,y)\}$; and then setting n=4, and directly setting a mark of every pixel point in image blocks in the starting seed image to 1, wherein the image blocks in the starting seed image has a same position with 8 image blocks, each of which having a size of 2×2, adjacent to every fuzzy seed block with a size of 4×4 in the $\{I_{S2}(x,y)\}$; and then setting n=2, and directly setting a mark of 8 pixel points in the starting seed image to 1, wherein the 8 pixel points in the starting seed image has a same position with the 8 pixel points adjacent to every fuzzy seed block with a size of 2×2 in the $\{I_{S2}(x,y)\}$, thereby obtaining the region growing image $\{I_{G2}(x,y)\}$ corresponding to the $\{I_{S2}(x,y)\}$, wherein the pixel point in $\{I_{S2}(x,y)\}$ whose corresponding mark in $\{I_{G2}(x,y)\}$ is 1 is a fuzzy pixel point, and the pixel point in $\{I_{S2}(x,y)\}$ whose corresponding mark in $\{I_{G2}(x,y)\}$ is 0 is a non-fuzzy pixel point.

11. The microscopic image fusion method based on region growing, as recited in claim 5, wherein in step (6), the acquisition process of the region growing image $\{I_{G1}(x,y)\}$ corresponding to the $\{I_{S1}(x,y)\}$ comprises steps of: (6-a1) while n=128, regarding the definition tagged image $\{I_{D1\_128}(x,y)\}$ corresponding to the $\{I_{S1}(x,y)\}$ as a starting seed image; (6-a2) studying 8 image blocks each of which having a size of $$\frac{n}{2} \times \frac{n}{2}$$

adjacent to every fuzzy seed block with the size of n×n in the $\{I_{S1}(x,y)\}$, wherein if a mark $$I_{D1\_\frac{n}{2}}(x, y)$$

corresponding to every pixel point in the image block with the size of $$\frac{n}{2} \times \frac{n}{2}$$

adjacent to every fuzzy seed block with the size of n×n in $\{I_{S1}(x,y)\}$ is 1, then a mark of every pixel point in the image block with the size of $$\frac{n}{2} \times \frac{n}{2}$$

at the same position in the starting seed image is set to 1; (6-a3) setting $$n = \frac{n}{2},$$

and returning to step (6-a2) till n=8, here, "=" is an assignment symbol in $$n = \frac{n}{2};$$

and (6-a4) while n=8, directly setting a mark of every pixel point in image blocks in the starting seed image to 1, wherein the image blocks in the starting seed image has a same position with 8 image blocks, each of which having a size of 4×4, adjacent to every fuzzy seed block with a size of 8×8 in the $\{I_{S1}(x,y)\}$; and then setting n=4, and directly setting a mark of every pixel point in image blocks in the starting seed image to 1, wherein the image blocks in the starting seed image has a same position with 8 image blocks, each of which having a size of 2×2, adjacent to every fuzzy seed block with a size of 4×4 in the $\{I_{S1}(x,y)\}$; and then setting n=2, and directly setting a mark of 8 pixel points in the starting seed image to 1, wherein the 8 pixel points in the starting seed image has a same position with the 8 pixel points adjacent to every fuzzy seed block with a size of 2×2 in the $\{I_{S1}(x,y)\}$, thereby obtaining the region growing image $\{I_{G1}(x,y)\}$ corresponding to the $\{I_{S1}(x,y)\}$, wherein the pixel point in $\{I_{S1}(x,y)\}$ whose corresponding mark in $\{I_{G1}(x,y)\}$ is 1 is a fuzzy pixel point, and the pixel point in $\{I_{S1}(x,y)\}$ whose corresponding mark in $\{I_{G1}(x,y)\}$ is 0 is a non-fuzzy pixel point;

wherein in step (6), the acquisition process of the region growing image $\{I_{G2}(x,y)\}$ corresponding to the $\{I_{S2}(x,y)\}$ comprises steps of: (6-b1) while n=128, regarding the definition tagged image $\{I_{D2\_128}(x,y)\}$ corresponding to the $\{I_{S2}(x,y)\}$ as a starting seed image; (6-b2) studying 8 image blocks each of which having a size of $$\frac{n}{2} \times \frac{n}{2}$$

adjacent to every fuzzy seed block with the size of n×n in the $\{I_{S2}(x,y)\}$, wherein if a mark $$I_{D2\_\frac{n}{2}}(x, y)$$

corresponding to every pixel point in the image block with the size of $$\frac{n}{2} \times \frac{n}{2}$$

adjacent to every fuzzy seed block with the size of n×n in $\{I_{S2}(x,y)\}$ is 1, then a mark of every pixel point in the image block with the size of $$\frac{n}{2} \times \frac{n}{2}$$

at the same position in the starting seed image is set to 1; (6-b3) setting $$n = \frac{n}{2},$$

and returning to step (6-b2) till n=8, here, "=" is an assignment symbol in $$n = \frac{n}{2};$$

and (6-b4) while n=8, directly setting a mark of every pixel point in image blocks in the starting seed image to 1, wherein the image blocks in the starting seed image has a same position with 8 image blocks, each of which having a size of 4×4, adjacent to every fuzzy seed block with a size of 8×8 in the $\{I_{S2}(x,y)\}$; and then setting n=4, and directly setting a mark of every pixel point in image blocks in the starting seed image to 1, wherein the image blocks in the starting seed image has a same position with 8 image blocks, each of which having a size of 2×2, adjacent to every fuzzy seed block with a size of 4×4 in the $\{I_{S2}(x,y)\}$; and then setting n=2, and directly setting a mark of 8 pixel points in the starting seed image to 1, wherein the 8 pixel points in the starting seed image has a same position with the 8 pixel points adjacent to every fuzzy seed block with a size of 2×2 in the $\{I_{S2}(x,y)\}$, thereby obtaining the region growing image $\{I_{G2}(x,y)\}$ corresponding to the $\{I_{S2}(x,y)\}$, wherein the pixel point in $\{I_{S2}(x,y)\}$ whose corresponding mark in $\{I_{G2}(x,y)\}$ is 1 is a fuzzy pixel point, and the pixel point in $\{I_{S2}(x,y)\}$ whose corresponding mark in $\{I_{G2}(x,y)\}$ is 0 is a non-fuzzy pixel point.

12. The microscopic image fusion method based on region growing, as recited in claim 6, wherein in step (6), the acquisition process of the region growing image $\{I_{G1}(x,y)\}$ corresponding to the $\{I_{S1}(x,y)\}$ comprises steps of: (6-a1) while n=128, regarding the definition tagged image $\{I_{D1\_128}(x,y)\}$ corresponding to the $\{I_{S1}(x,y)\}$ as a starting seed image; (6-a2) studying 8 image blocks each of which having a size of $$\frac{n}{2} \times \frac{n}{2}$$

adjacent to every fuzzy seed block with the size of n×n in the $\{I_{S1}(x,y)\}$, wherein if a mark $$I_{D1\_\frac{n}{2}}(x,y)$$

corresponding to every pixel point in the image block with the size of $$\frac{n}{2} \times \frac{n}{2}$$

adjacent to every fuzzy seed block with the size of n×n in $\{I_{S1}(x,y)\}$ is 1, then a mark of every pixel point in the image block with the size of $$\frac{n}{2} \times \frac{n}{2}$$

at the same position in the starting seed image is set to 1; (6-a3) setting $$n = \frac{n}{2},$$

and returning to step (6-a2) till n=8, here, "=" is an assignment symbol in $$n = \frac{n}{2};$$

and (6-a4) while n=8, directly setting a mark of every pixel point in image blocks in the starting seed image to 1, wherein the image blocks in the starting seed image has a same position with 8 image blocks, each of which having a size of 4×4, adjacent to every fuzzy seed block with a size of 8×8 in the $\{I_{S1}(x,y)\}$; and then setting n=4, and directly setting a mark of every pixel point in image blocks in the starting seed image to 1, wherein the image blocks in the starting seed image has a same position with 8 image blocks, each of which having a size of 2×2, adjacent to every fuzzy seed block with a size of 4×4 in the $\{I_{S1}(x,y)\}$; and then setting n=2, and directly setting a mark of 8 pixel points in the starting seed image to 1, wherein the 8 pixel points in the starting seed image has a same position with the 8 pixel points adjacent to every fuzzy seed block with a size of 2×2 in the $\{I_{S1}(x,y)\}$, thereby obtaining the region growing image $\{I_{G1}(x,y)\}$ corresponding to the $\{I_{S1}(x,y)\}$, wherein the pixel point in $\{I_{S1}(x,y)\}$ whose corresponding mark in $\{I_{G1}(x,y)\}$ is 1 is a fuzzy pixel point, and the pixel point in $\{I_{S1}(x,y)\}$ whose corresponding mark in $\{I_{G1}(x,y)\}$ is 0 is a non-fuzzy pixel point;

wherein in step (6), the acquisition process of the region growing image $\{I_{G2}(x,y)\}$ corresponding to the $\{I_{S2}(x,y)\}$ comprises steps of: (6-b1) while n=128, regarding the definition tagged image $\{I_{D2\_128}(x,y)\}$ corresponding to the $\{I_{S2}(x,y)\}$ as a starting seed image; (6-b2) studying 8 image blocks each of which having a size of $$\frac{n}{2} \times \frac{n}{2}$$

adjacent to every fuzzy seed block with the size of n×n in the $\{I_{S2}(x,y)\}$, wherein if a mark $$I_{D2\_\frac{n}{2}}(x,y)$$

corresponding to every pixel point in the image block with the size of $$\frac{n}{2} \times \frac{n}{2}$$

adjacent to every fuzzy seed block with the size of n×n in $\{I_{S2}(x,y)\}$ is 1, then a mark of every pixel point in the image block with the size of $$\frac{n}{2} \times \frac{n}{2}$$

at the same position in the starting seed image is set to 1; (6-b3) setting $$n = \frac{n}{2},$$

and returning to step (6-b2) till n=8, here, "=" is an assignment symbol in $$n = \frac{n}{2};$$

and (6-b4) while n=8, directly setting a mark of every pixel point in image blocks in the starting seed image to 1, wherein the image blocks in the starting seed image has a same position with 8 image blocks, each of which having a size of 4×4, adjacent to every fuzzy seed block with a size of 8×8 in the $\{I_{S2}(x,y)\}$; and then setting n=4, and directly setting a mark of every pixel point in image blocks in the starting seed image to 1, wherein the image blocks in the starting seed image has a same position with 8 image blocks, each of which having a size of 2×2, adjacent to every fuzzy seed block with a size of 4×4 in the $\{I_{S2}(x,y)\}$; and then setting n=2, and directly setting a mark of 8 pixel points in the starting seed image to 1, wherein the 8 pixel points in the starting seed image has a same position with the 8 pixel points adjacent to every fuzzy seed block with a size of 2×2 in the $\{I_{S2}(x,y)\}$, thereby obtaining the region growing image $\{I_{G2}(x,y)\}$ corresponding to the $\{I_{S2}(x,y)\}$, wherein the pixel point in $\{I_{S2}(x,y)\}$ whose corresponding mark in $\{I_{G2}(x,y)\}$ is 1 is a fuzzy pixel point, and the pixel point in $\{I_{S2}(x,y)\}$ whose corresponding mark in $\{I_{G2}(x,y)\}$ is 0 is a non-fuzzy pixel point.

\* \* \* \* \*